United States Patent
Witzel et al.

(10) Patent No.: US 8,441,949 B2
(45) Date of Patent: May 14, 2013

(54) METHODS, APPARATUSES AND COMPUTER PROGRAM PRODUCTS FOR ROUTING A CALL FROM A CIRCUIT SWITCHED DOMAIN TO A UNIFIED SERVICE DOMAIN

(75) Inventors: Andreas Witzel, Herzogenrath (DE); Ralf Keller, Würselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 382 days.

(21) Appl. No.: 12/518,633

(22) PCT Filed: Dec. 14, 2006

(86) PCT No.: PCT/EP2006/012047
§ 371 (c)(1),
(2), (4) Date: Jun. 10, 2009

(87) PCT Pub. No.: WO2008/071213
PCT Pub. Date: Jun. 19, 2008

(65) Prior Publication Data
US 2010/0135204 A1    Jun. 3, 2010

(51) Int. Cl.
*H04L 12/56* (2006.01)
(52) U.S. Cl.
USPC ........... 370/252; 370/351; 370/352; 370/353; 370/354; 370/355
(58) Field of Classification Search ........................ None
See application file for complete search history.

(56) References Cited

U.S. PATENT DOCUMENTS

| | | | |
|---|---|---|---|
| 2002/0187787 A1 | 12/2002 | Fry | |
| 2003/0154242 A1* | 8/2003 | Hayes et al. | 709/203 |
| 2006/0104262 A1* | 5/2006 | Kant et al. | 370/352 |
| 2007/0121608 A1* | 5/2007 | Gu et al. | 370/356 |
| 2008/0034217 A1* | 2/2008 | McQuaide | 713/186 |

(Continued)

FOREIGN PATENT DOCUMENTS

| | | |
|---|---|---|
| EP | 1 744 569 A1 | 1/2007 |
| WO | WO 02/104057 A1 | 12/2002 |
| WO | WO 2005/027460 A1 | 3/2005 |
| WO | WO 2006/111845 A2 | 10/2006 |

OTHER PUBLICATIONS

LG Electronics. Call Termination in Case the CSI Capable UE is Not IMS Registered. 3GPP TSG-SA Meeting #55, S2-063833. Busan, Korea. Oct. 23, 2006.

(Continued)

*Primary Examiner* — Kibrom T Hailu
*Assistant Examiner* — Zewdu A Beyen

(57) ABSTRACT

A technique for routing a call to a unified service domain using one or more client applications providing call routing support from a circuit-switch access domain to unified service domain is described. A first one of the client applications will be provided on a network side and a second one of the client applications may potentially be provided on a terminal side. A method implementation of this technique comprises, on the network side, the steps of receiving a message from the terminal side, detecting, in response to the message, the client application that is to provide the routing functionalities, and controlling an activation state of at least one of the two client applications dependent on a result of this detection.

25 Claims, 19 Drawing Sheets

U.S. PATENT DOCUMENTS

2008/0049648 A1* 2/2008 Liu et al. .................. 370/310
2008/0051071 A1* 2/2008 Vishwanathan et al. ... 455/414.1
2008/0130624 A1* 6/2008 Hua et al. .................. 370/350

OTHER PUBLICATIONS

3GPP, 3$^{rd}$ Generation Partnership Project; Technical Specification Group Services and System Aspects; Combining Circuit Switched (CS) and IP Multimedia Subsystem (IMS) Services; Stage 2 (Release 7). 3GPP TS 23.279 v7.5.0. Dec. 11, 2006.

3GPP, Combining Circuit Switched (CS) and IP Multimedia Subsystem (IMS) Services; Stage 2 (Release 7), 3GPP TS 23.279 Specification Detail; retrieved from the internet—http://www.3gpp.org/ftp/Specs/html-info/23279.htm.

3GPP. 3$^{rd}$ Generation Partnership Project; Technical Specification Group Services and System Aspects; IP Multimedia System (IMS) Centralized Services (Release 8). 3GPP TR 23.982 v0.1.0. Oct. 2006.

Lucent, et al. New WID for IMS Centralized Services. 3GPP TSG SA WG2 Architecture—SA2#54. Tdoc 52-063335, Sophia Antipolis, France. Sep. 1, 2003.

* cited by examiner

METHODS, APPARATUSES AND COMPUTER PROGRAM PRODUCTS FOR ROUTING A CALL FROM A CIRCUIT SWITCHED DOMAIN TO A UNIFIED SERVICE DOMAIN

FIELD OF THE INVENTION

The invention generally relates to call routing techniques. In particular, the invention relates to a technique for routing a call from a circuit-switched access domain to a unified service domain.

BACKGROUND OF THE INVENTION

In the second (2G) and third generation (3G) mobile communication systems, distinct switching domains can be identified within the access networks that attach user terminals to core networks servicing the user terminals. These switching domains include the circuit-switched (CS) domain and the packet-switched (PS) domain. In the CS domain, signals are physically transported to their destination through a unique connection, whereas in the PS domain individual packets are dynamically routed to the appropriate destinations based on a destination address associated with each packet.

2G and 3G user terminals operated according to the current GSM (Global System for Mobile communication) and WCDMA (Wideband Code Division Multiple Access) standards typically access the core network via a CS access network, i.e. via the CS domain. From the CS access domain, a call will be routed to a specific service domain in the core network.

Various service domains are currently deployed for providing call services including originating, termination or mid-call services. In the past, mobile communication networks were pure CS networks. That is, the CS paradigm was underlying both the access domain and the service domain. As mobile communication networks are evolving from pure CS networks towards Internet Protocol (IP)-based networks, novel service domains are introduced. One of these novel service domains is the IP Multimedia Subsystem (IMS) currently standardised by the Third Generation Partnership Project (3GPP). The IMS is a network architecture servicing both fixed and mobile terminals which seamlessly integrates into the ubiquitous IP environment, including the Internet and other PS-based networks.

The enhanced features of the IMS service domain and of the other novel service domains are in most cases provided on a subscription basis. This means in the exemplary case of IMS that a particular call will only be routed to the IMS service domain if an IMS subscription can be determined for at least one terminal involved in the call. Otherwise, that is, if no IMS subscription can be determined, the call services will be provided in a conventional manner and typically in a CS-based service domain.

The multitude of different service domains that may be available for an individual call requires a mechanism which selectively switches on a call-by-call basis from a specific access domain to either a conventional (CS-based) service domain, to the IMS service domain, or to any other novel service domain. Depending on the current subscription status or other parameters, some call services required for or requested by a user terminal might thus be provided in one service domain, whereas other call services for this terminal might be provided in an alternative service domain. For a roaming mobile terminal, one and the same service might even be provided in different service domains when the network capabilities change with the location of the terminal. Both scenarios result in a non-uniform user experience due to the various different service domains potentially treating calls involving one and the same terminal.

In order to provide a more uniform user experience, and also to reduce the workload associated with service domain switching techniques, it would be desirable to provide a unified service domain instead of a plethora of different service domains. A corresponding solution for consistently routing calls from a CS network access through the IMS network to the IMS service domain is currently investigated by the 3GPP. The work item is called IMS Centralized Services (ICS) and aims at moving all subscribers to the IMS for a harmonization of the service environment (see 3GPP TSG SA WG2 Architecture—SA2#5, Sophia Antipolis, France, Aug. 28 to Sep. 1, 2006, Tdoc S2-063335).

The routing mechanisms required for a deployment of ICS necessitate the installation of an ICS client application that provides the underlying functionalities. Currently, two basic alternatives for the client installation are investigated. According to a first, network-centric concept, the network side is enhanced with the new routing functionalities. That is, the ICS client application is installed in the network, for example on a Mobile Switching Centre (MSC) or on an MSC server (MSC-S). As a second installation concept, the ICS client application could be placed in the terminal.

Both concepts have their merits and their drawbacks. For an early introduction, for example, it would be desirable to support ICS very quickly on the network side. Moreover, the network-centric approach scales better in the envisaged mass deployment scenario and provides ICS support also for legacy and low-end terminals. However, since there will initially be only few ICS users, a terminal-centric solution might be more resource-efficient until the unified service paradigm is generally adopted.

Accordingly, there is a need for a technique that efficiently realizes a unified service domain without renouncing on the benefits of the individual installation alternatives for the client application.

SUMMARY OF THE INVENTION

According to a first aspect, a method of controlling an activation state of one or more client applications providing functionalities that support the routing of call from a circuit switched access domain to a unified service domain is provided, wherein a first client application is provided on a network side and a second client application is potentially provided on a terminal side. The method comprises, on the network side, the steps of receiving a message from the terminal side; detecting, in response to the message, the client application that is to provide the routing functionalities; and controlling the activation state of at least one of the first client application and the second client application dependent on a result of the detection.

The unified service domain can be a service domain that is selected among two or more potentially available service domains as the particular service domain for service domain harmonization. The selection can be performed by a network operator. In one variation, the unified service domain is the IMS service domain under the ICS paradigm as described in 3GPP TSG SA WG2 Architecture—SA2#5, Sophia Antipolis, France, Aug. 28 to Sep. 1, 2006, Tdoc S2-063335, herewith incorporated by reference, in particular as far as the functionalities of client applications and aspects of the unified service domain are concerned.

While the access domain is preferably a CS access domain, this does not rule out any call transfers from the CS access domain to another access domain (e.g. an PS domain such as the IP-CAN), or from such another access domain to the CS access domain, or between two different CS access domains. Such call transfers may occur, for example, in service continuity scenarios such as Voice Call Continuity (VCC).

The functionalities of the one or more client applications that support the routing of a call from a circuit switched access domain to a unified service domain may include the routing of session control signalling between a client application and an interface component towards the unified service domain (such as an IMS Interface Adapter). In addition to session control signalling, routing of media data and media data-related signalling may also be supported.

The detection of the particular client application that is to provide the required routing functionalities may include determining the available capabilities on the terminal side and/or on the network side. In one scenario, it is determined if the second client application is provided on the terminal side at all, or the particular functionalities of any second client application provided on the terminal side are determined. In addition, or as an alternative, it is determined if the first client application is provided on network side at all, or the particular functionalities of any first client application provided on the network side are determined. The detection may further include selecting one of the first and second client application for the provision of the routing functionalities. This decision may be based on the availability of at least one of the first and the second client application and/or on the particular functionalities provided by at least one of the first and second client application.

As has been mentioned above, the detection is performed in response to receipt of a message from the terminal side. According to a first variant, the message includes information that will be evaluated during the detection step. According to a second variant that can be combined with the first variant, receipt of the message serves as a trigger for initiating the detection step. According to a still further variant, the detection step is performed in a close temporal relationship with receipt of the message (e.g., message reception starts a timer that specifies a time interval for performing the detection step).

In one control scenario of the present invention, the first client application residing on the network side is controlled to be in an activated state if no second client application can be detected on the terminal side. In another control scenario, the first client application is controlled to be in a de-activated state if the second client application can be detected. In the de-activated state of the first client application, the method as performed by a node on the network side may further comprise transparently forwarding any control signalling from and to the second client application.

The message received from the terminal side may include an indication of the particular client application that is to provide the call routing functionalities. This indication may, for example, include a notification about the availability of the second client application on the terminal side or, in the alternative, an instruction relating to the activation of the first client application on the network side. Stiff further, the indication may be a request for registering the user terminal in the unified service domain. This registration request may have been generated by or under control of the second network application (thus indicating the availability of the second client application on the terminal side). Based on any indication received via the message from the terminal side, the network side may control the activation state of the network-based first client application accordingly.

The network side may control the activation state of the network-based first client application, of the terminal-based second client application, or of both client applications. Controlling the activation state of the second client application on the terminal side may include sending an activation instruction concerning an activation state of the second client application to the terminal side. Hence, the second client application may either be activated or de-activated.

On the network side, one or more location register databases such as a Home Location Register (HLR) database or a Visitor Location Register (VLR) database may be provided. The method may then further comprise the step of storing the current activation state of at least one of the first and second client application in the location register database. Additionally, the service state of at least one service requested from or provided in the unified service domain may be stored in the location register database.

In one scenario, the method further comprises the steps of selecting an interface component towards the unified service domain; and connecting an activated one of the first and second client application to the selected interface component. An identifier of the selected interfacing component (e.g. its network address) may be sent to at least one of the location register database(s) and the activated one of the first and second client application.

For a terminal roaming into a visited network, the method may additionally comprise the steps of receiving, by the visited network, the identifier of the selected interface component; and performing, by the visited network, a renewal of the registration of the roaming terminal in the unified service domain via the selected interface component. In the visited network, the further step of receiving and assessing the activation state of the first client application in the previous network may be performed. Depending on the activation state of the first client application in the previous network, a new first client application may be instantiated in the visited network. Such an instantiation may occur in particular if it has been determined that the first client application in the previous network is or has been in the activated state.

Individual ones or all of the routing functionalities may be provided on a subscription basis. In such a case, the method as performed on the network side may further comprise at least one of requesting and receiving subscription information. The routing functionalities of the first client application may then be provided dependent on the existence of a subscription. Furthermore, authorization information regarding the routing functionalities may be requested within the network. Upon receipt and evaluation of the requested authorization information, it may then be decided whether or not a particular terminal is to be registered in the unified service domain.

According to another aspect of the invention, a method of controlling an activation state of one or more client applications providing functionalities that support the routing of a call from a circuit-switched access domain to a unified service domain is provided, wherein a first client application is provided on a network side and a second client application is potentially provided on a terminal side. The method comprises on the terminal side the steps of generating an indication of the client application that is to provide the call routing functionalities; and transmitting the indication to the network side. With this indication, the activation state of the first client application on the network side may be influenced as discussed above.

In one variation, the method comprises the further step of providing the second client application on the terminal side. In such a case, the indication transmitted to the network side may include a reference to the availability of the second client application on the terminal side. In addition, or as an alternative, the indication may include any reference to the first client application provided on the network side. The network side may interpret the reference to the first client application as an instruction to control the first client application to be in an activated state.

The invention can be practiced in the form of hardware, in the form of software, or in the form of a combined hardware/software approach. As for a software aspect, a computer program product is provided. The computer program product comprises program code portions for performing the steps of the present invention when the computer program product is run on one or more computing devices. The computer program product may be stored on a computer-readable recording medium.

According to a hardware aspect, a network node for controlling an activation state of one or more client applications providing functionalities that support the routing of a call from a circuit-switched access domain to a unified service domain is provided, wherein a first client indication is provided on a network side and a second client application is potentially provided on a terminal side. The network component comprises an interface adapted to receive a message from the terminal side; a detector adapted to detect, in response to the message, the client application that is to provide the routing functionalities; and a controller adapted to control the activation state of at least one of the first client application and the second client application dependent on a result of the detection.

According to another hardware aspect, a terminal for controlling an activation state of one or more client applications providing functionalities that support the routing of a call from a circuit-switched access domain to a unified service domain is provided, wherein a first client application is provided on a network side and a second client application is potentially provided on a terminal side. The terminal comprises an interface adapted to transmit to the network side an indication of the client application that is to provide the call routing functionalities. The terminal may further comprise a processor for generating the indication. Moreover, the terminal may be equipped with the second client application.

BRIEF DESCRIPTION OF THE DRAWINGS

In the following, the invention will be described with reference to exemplary embodiments illustrated in the drawings, wherein.

DESCRIPTION OF PREFERRED EMBODIMENTS

In the following description, for purposes of explanation and not limitation, specific details are set forth, such as particular sequences of steps, interfaces and configurations, in order to provide a thorough understanding of the present invention. It will be apparent to one skilled in the art that the present invention may be practiced in other embodiments that depart from these specific details. For example, while the embodiments will exemplarily be described in context with a unified IMS service domain, it is clear that the invention can also be practiced in other unified service domains different that encompassed by IMS. Moreover, while individual protocols such as the Unstructured Supplementary Service Data (USSD) protocol, the ISDN User Part (ISUP) protocol and the Bearer Independent Call Control (BICC) protocol will be described in the following embodiments, it will readily be apparent that other suitable protocols might be used instead of or in addition to one or more of these protocols Those skilled in the art will further appreciate that the functions explained herein below may be implemented using software functioning in conjunction with a programmed microprocessor or general purpose computers. It will also be appreciated that while the current invention is primarily described in the form of methods and apparatuses, the invention may also be embodied in a computer program product as well as in a system comprising a computer processor and a memory coupled to the processor, wherein the memory is encoded with one or more programs that may perform the functions disclosed herein.

Figure 1:
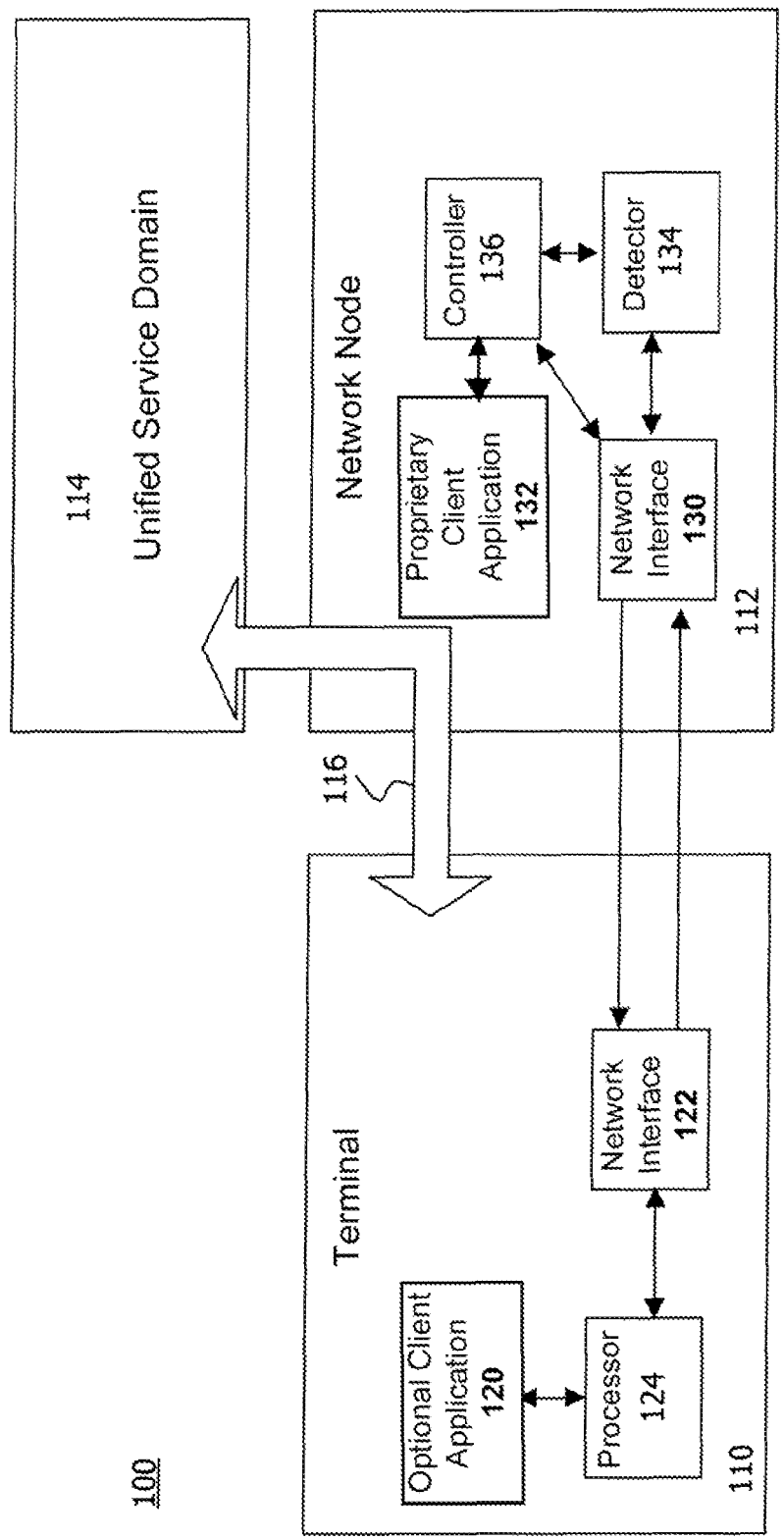
FIG. 1 is a schematic block diagram illustrating a communication network including two apparatus embodiments of the present invention.

FIG. 1 illustrates a communication network 100 including two apparatus embodiments in the form of a terminal 110 on the one hand and a network node 112 on the other hand. The communication network 100 further includes a unified service domain 114. The terminal 110 may be a fixed or mobile terminal such as a personal computer, a mobile telephone or a personal digital assistant. The network node 112 may be a network switching component such as an MSC or an MSC-S. Preferably, the network node 102 is attached to or forms part of a CS access domain via which the terminal 110 can be attached to the unified service domain 114 as illustrated by arrow 116 in FIG. 1.

The terminal 110 comprises an optional client application 120 that provides functionalities which support the routing of a call from the CS access domain with the network node 112 to the unified service domain 114. The client application 120 is optional in that it could potentially be omitted (for example if a client application providing essentially the same functionalities is located on the network node 112). The terminal 110 further comprises a network interface 122 adapted to transmit to the network node 112 an indication of the particular client application that is to provide the functionalities for routing a call to the unified service domain 114. The indication to be transmitted via the network interface 122 is generated by a processor 124 of the terminal 110. As shown in FIG. 1, the processor 124 is adapted to communicate with both the optional client application 120 and the network interface 122.

The network node 112 comprises a network interface 130 adapted to receive a message from the terminal 110. The message received via the network interface 130 from the terminal 110 may include an indication of the client application that is to provide the call routing functionalities. However, the message may in principle lack such an indication without affecting the operation of the network node 112. In such a case unified service domain support may automatically be provided by the network node 112.

As shown in FIG. 1, the network node 112 further comprises a proprietary client application 132 for selectively providing unified service domain support. Similar to the optional client application 120 of the terminal 110, the network-based client application 132 is adapted to provide functionalities which support the routing of a call from the terminal 110 via the network node 112 to the unified service domain 114 (see arrow 116). The network node 112 additionally comprises a detector 134 coupled to the network interface 130. The detector 134 is adapted to detect, in response to receipt of a message via the network interface 130, the client application that is to provide the routing functionalities.

The detector 134 communicates with a controller 136 adapted to control the activation state of at least one of the network-based client application 132 and the optional terminal-based client application 120 dependent on a result of the detection performed by the detector 134. Dependent on the detection result, the controller 136 may, for example, activate or deactivate the network-based client application 132. However, the controller 136 may also remote-control the activation state of the terminal-based client application 120. To this end, the controller 136 may transmit control instructions via the network interface 130 to the terminal 110.

Figure 2:
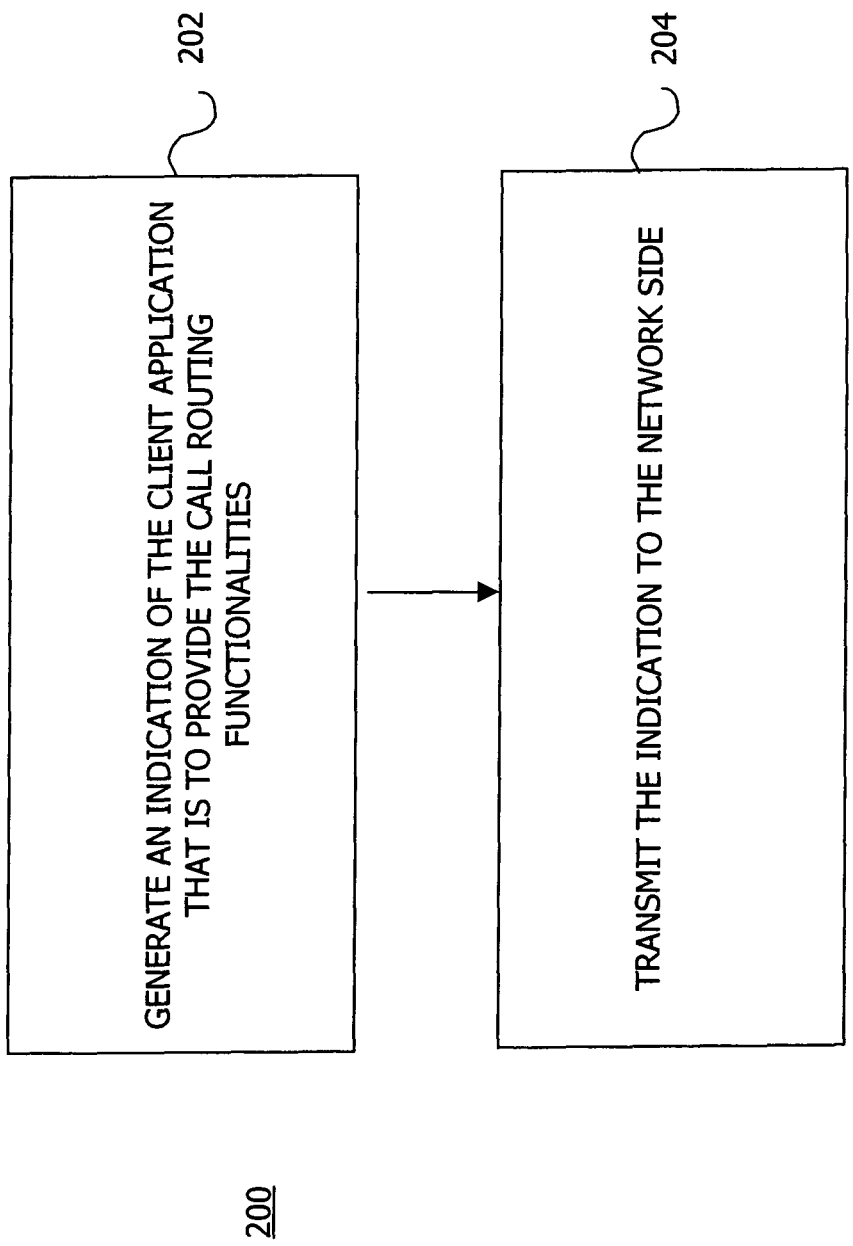
FIG. 2 is a flow chart illustrating a first method embodiment of the present invention.

FIG. 2 shows a flow chart 200 of a first method embodiment of the present invention. The embodiment aims at controlling an activation state of one or more client applications providing functionalities that support the routing of a call from a CS access domain to a unified service domain, wherein a first client application is provided on a network side and an optional second client application is potentially provided on a terminal side. The method as illustrated in FIG. 2 may be practised by the terminal 110 shown in FIG. 1 or by any other terminal.

The method starts in step 202 with generation of an indication of the particular client application that is to provide the call routing functionalities. In one example, the indication allows for a detection on the network side that a client application is in fact provided on the terminal side. In another example, the indication requests an activation of a network-based client application.

Once the indication has been generated in step 202, the method continues with step 204. In step 204, the indication is transmitted to the network side. To this end, the indication may be packed into a control message interpretable by the network node detecting the client application that is to provide the routing functionalities. By transmitting the indication to the network side, the terminal can remote-control an activation state of a network-based client application.

Figure 3:
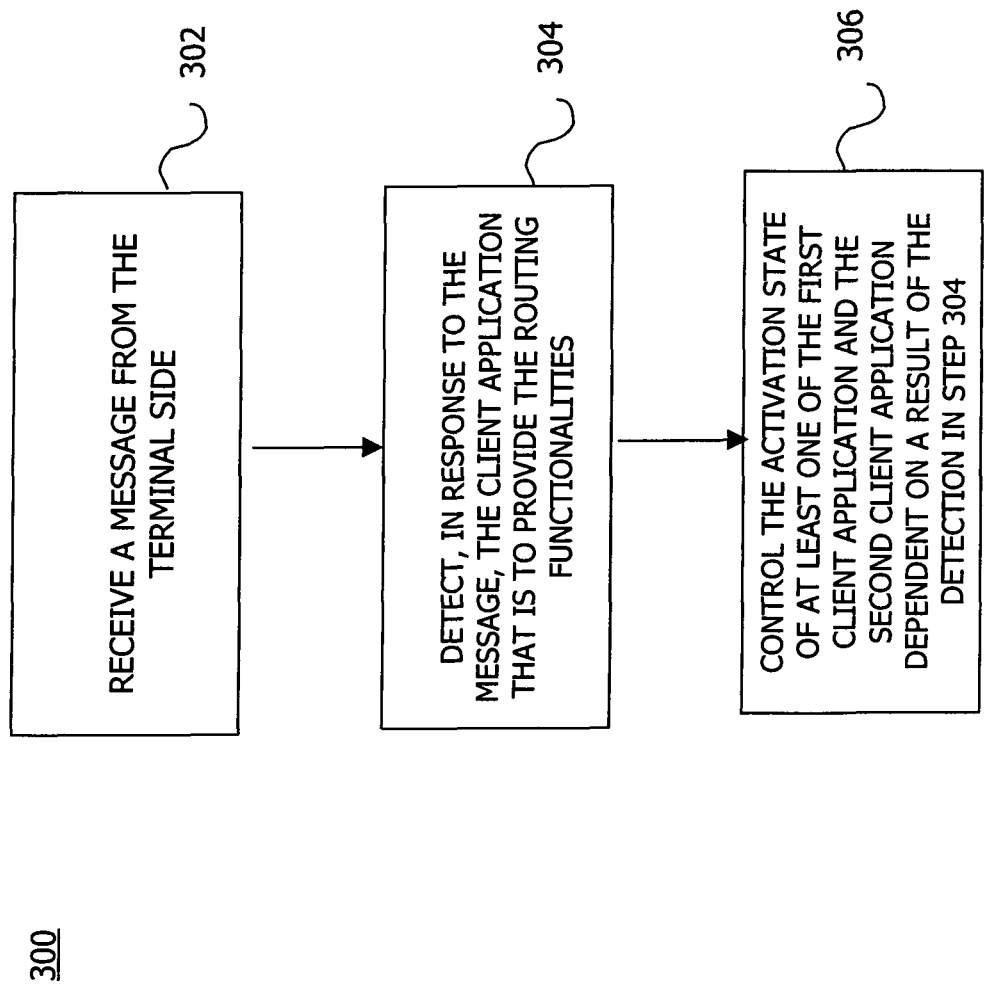
FIG. 3 is a flow chart illustrating a second method embodiment of the present invention.

FIG. 3 shows a flow chart 300 of another embodiment for controlling an activation state of one or more client applications providing functionalities that support the routing of a call from a CS access domain to a unified service domain. This method embodiment may be practised by the network node 112 shown in FIG. 1 or by any other network node.

In an initial step 302, a message is received from the terminal side. The message may be a conventional message according to an existing protocol standard. The message may or may not include an indication as discussed above in context with the method embodiment illustrated in FIG. 2.

Upon receipt of the message, the method continues with step 304 in which the client application that is to provide the routing functionalities is detected. This detection can be based on the content of the message received in step 302. Alternatively, the detection can simply be triggered by receipt of this message.

In a further step 306, the activation state of at least one of a network-based client application and a terminal-based client application is controlled dependent on a result of the detection step 304. The control may include an activation of one of the client applications and a simultaneous de-activation of the other client application. In case no client application is provided on the terminal side, step 306 may only include activating the network-based client application. If the network-based client application is per default in an activated state, step 306 would result in maintaining the activated state of the network-based client application.

Exemplary ICS Implementation

In the following, various further embodiments will be discussed with reference to the schematic network and signalling diagrams of FIGS. 4 to 19. The same reference numerals as used in FIG. 1 will be used to designate identical or similar components.

The further embodiments of FIGS. 4 to 19 relate to the dynamic selection of either a network-based or a terminal-based client application in an exemplary ICS context. First, more detailed solutions for installing the client application on the terminal (FIG. 4) and in the network (FIG. 5) will be explained.

Terminal-Based and Network-Based ICS Client Applications

Figure 4:
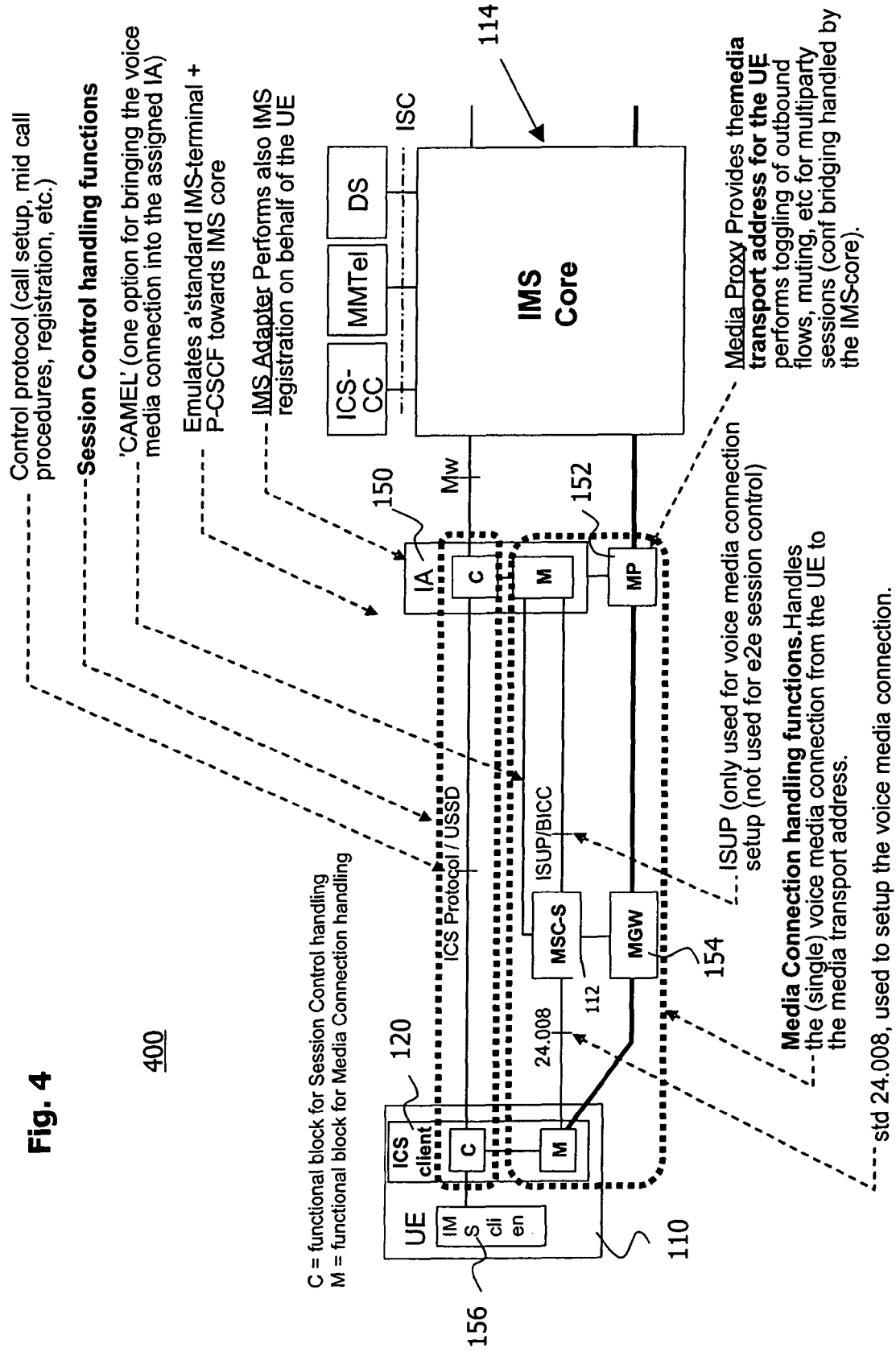
FIGS. 4 to 19 are schematic block diagrams and schematic signalling diagrams illustrating various further embodiments of the present invention in an exemplary ICS context.

The network system 400 of FIG. 4 includes a terminal 110 (also called User Equipment, UE) having a CS network access. The terminal 110 comprises an IMS client application 156 and additionally an ICS client application 120. An MSC-S 112, a Media Gateway (MGW) 154, an Interface Adapter (IA) 150 serving as an interface towards an IMS 114, and a Media Proxy (MP) 152 are additionally included in the network system 400.

The ICS client application 120 on the terminal 110 provides dedicated tasks in the ICS context and includes two functional components reflecting the layered architecture of the network system 400. On a control layer (or control plane), the ICS client application 120 includes a functional block "C" for session control handling. On a user layer (or user plane), the ICS client application 120 includes a functional block "M" for media connection handling. The individual functional blocks of the ICS client application 120 communicate with corresponding functional blocks of the IA 150. Communication on the control layer involves an ICS protocol over USSD, whereas communication on the user layer involves protocols according to the 3GPP Technical Specification 24.008 standard on the one hand (between the ICS client application 120 and the MSC-S 112) and ISUP/BICC on the other hand (between the MSC-S 112 and the MP 152).

The control layer and the user layer are attached via the IA 150 and the MP 152 to the IMS 114. As shown in FIG. 4, the IMS 114 includes an IMS core as well as IMS application services (such as Multimedia Telephony (MMTel) services). The IMS core and the IMS application services communicate via the ISC protocol.

Assuming the existence of an ICS client application somewhere on the network side (see, for example, FIG. 1 above or FIG. 5 below), the terminal 110 of FIG. 4 may be configured to perform the method embodiment discussed above in context with FIG. 2. In one implementation, the terminal 110 sends an indication towards the network side which informs the network side about the availability of the ICS client application 120 in the terminal 110.

Figure 5:
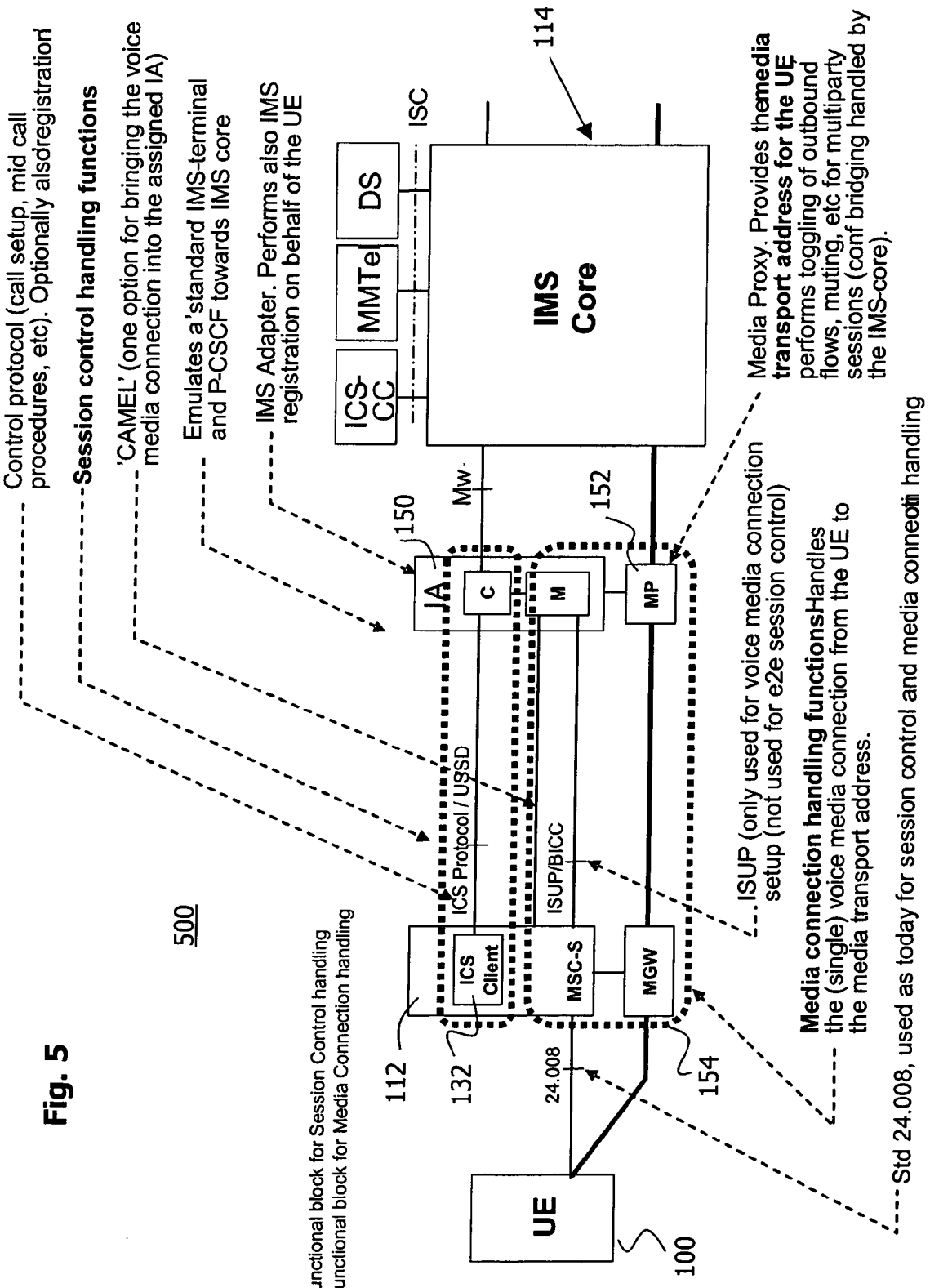

While FIG. 4 illustrates a network system 400 with a terminal-based ICS client application 120, a network system 500 with a network-based ICS client application 132 is shown in FIG. 5. As becomes apparent from FIG. 5, the ICS client application 132 is installed on the MSC-S 112. Another ICS client application may be installed on the terminal 110 (as shown in FIG. 4). The MSC-S 112 of FIG. 5 may be configured to perform the method embodiment explained above in context with FIG. 3. The remaining components of the network system 500 are similar to the components of the network system 400 discussed above, and a more detailed description will thus be omitted here.

With reference to FIGS. 4 and 5, it will in the following be assumed that the ICS client application 132 (also called "uICS client") will always be installed on the network side, and that the ICS client application 120 (also called "nICS client") may or may not be installed on the terminal side.

As already explained above, the ICS client application (network-based or terminal based) will be connected to an IMS IA 150 which serves as an interfacing node towards the IMS 114. The implementation of the IA 150 should not be dependent on the location of the ICS client application, i.e. the placement of the ICS client application (on the terminal side or on the network side) is preferably invisible to the IA 150.

The ICS client application 132 in the MSC-S 112 uses the ICS protocol over USSD in the same way as the terminal 110 would do in a terminal centric solution. At Location Update/IMSI Attach procedures initiated by the terminal 110 by corresponding messages, the MSC-S 112 tries to detect an ICS client application in the terminal 110. If the terminal 110 has the capability of an ICS client (as shown, for example, in FIG. 4), the ICS client application 132 in the MSC-S 112 is deactivated. Otherwise, i.e. if no ISC client application can be detected on the terminal 110, the ICS client application 132 in the MSC-S 112 is activated (or maintained in the activated state should this be the default state). A subscriber operating the terminal 110 may select a particular ICS client application as default (e.g. via a web portal) and thus override any network-based selection.

ICS-related information about at least the activation state of the ICS client application 132 and about the availability/activation state of an ICS client application 120 potentially provided on the terminal 110 is stored locally in a VLR (not shown in FIGS. 4 and 5) of the MSC-S 112. Such information can also be uploaded o the HLR (not shown in FIGS. 4 and 5).

The status of the ICS client (as kept in the MSC-S 112 and the HLR) can therefore take the following states:
Network-induced de-activated=Terminal-based ICS client assumed
Network-induced activated (& IA ID)=Network-based ICS client assumed
Subscriber activated=forced network-based
  The USSD application in the MSC-S 112 is blocked
  The MSC-S-based ICS client is always used
Subscriber deactivated=forced terminal-based
  The ICS client in the MSC-S 112 never kicks in
  The USSD application in the MSC-S 112 is activated If at Location Update/IMSI Attach the MSC-S 112 cannot detect any terminal-based ICS client application, the network-based ICS client application 132 will select an IA node 150 to be used for interfacing towards the INS 114. Once the IA node 150 and IA instance have been seized, the ICS client application 132 initiates an IMS Registration procedure. An IA identifier is returned to the ICS client application 132, and in case of a network-based ICS client the IA identifier and the related ICS service state are stored in VLR and uploaded to HLR.

When the terminal 110 is roaming from an area serviced by the MSC-S 112 (and by the ISC client application 132 of the MSC-S 112) into an area of a new MSC-S, the IA identifier and the ICS service state are received in the new MSC-S from the HLR together with the subscriber data. The IA 150 identified by the received IA identifier will then used by the new MSC-S to re-new the IMS Registration for the roaming terminal 110. This means that the identity of the connecting IA 150 does not change when the terminal 110 is roaming.

The ICS client application 132 in the previous MSC-S 112 is released upon receipt of a Cancel Location indication from the HLR. In the case the terminal 110 detaches from the MSC-S 112, the IA 150 has to be released also.

In a network-based ICS client scenario, the ICS client application 132 in the MSC-S 112 will de-register the terminal 110 and release the IA instance. In the case of a terminal-based ICS client application 120, an IA timer supervises the IMS Registration by the terminal 110. If the timer expires, the IA instance is released.

In the embodiments shown in FIGS. 4 to 19, the ICS functionalities in the IMS 114 are provided on a subscription basis. ICS subscription is provisioned per subscriber by the operator in the HLR and downloaded to the MSC-S 112 with a conventional MAP Insert Subscriber Data message. If for the terminal 110 serviced by the MSC-S 112 no ICS subscription can be determined, the terminal 110 is handled in accordance with an ordinary CS subscription and will be conventionally serviced in the CS service domain. If, however, an ICS subscription can be determined for the terminal 110, a network- or terminal-based ICS client application is activated, depending on the ICS client state (possible ICS client states have already been described above). There can be an additional uICS barring indication in the subscriber data. By setting the uICS barring indication, the operator can prevent the usage of any terminal-based ICS client application.

The above basic mechanisms involving the dynamic selection of either a terminal-based ICS application 120 (see FIG. 4) or a network-based ICS client application 132 (see FIG. 5) will now be described in more detail with reference to the signalling scenarios of FIGS. 6 to 19. The basic procedures of IMSI Attach that trigger the dynamic selection of an ICS client application will be presented first.

IMSI Attach Procedures

Figure 6:
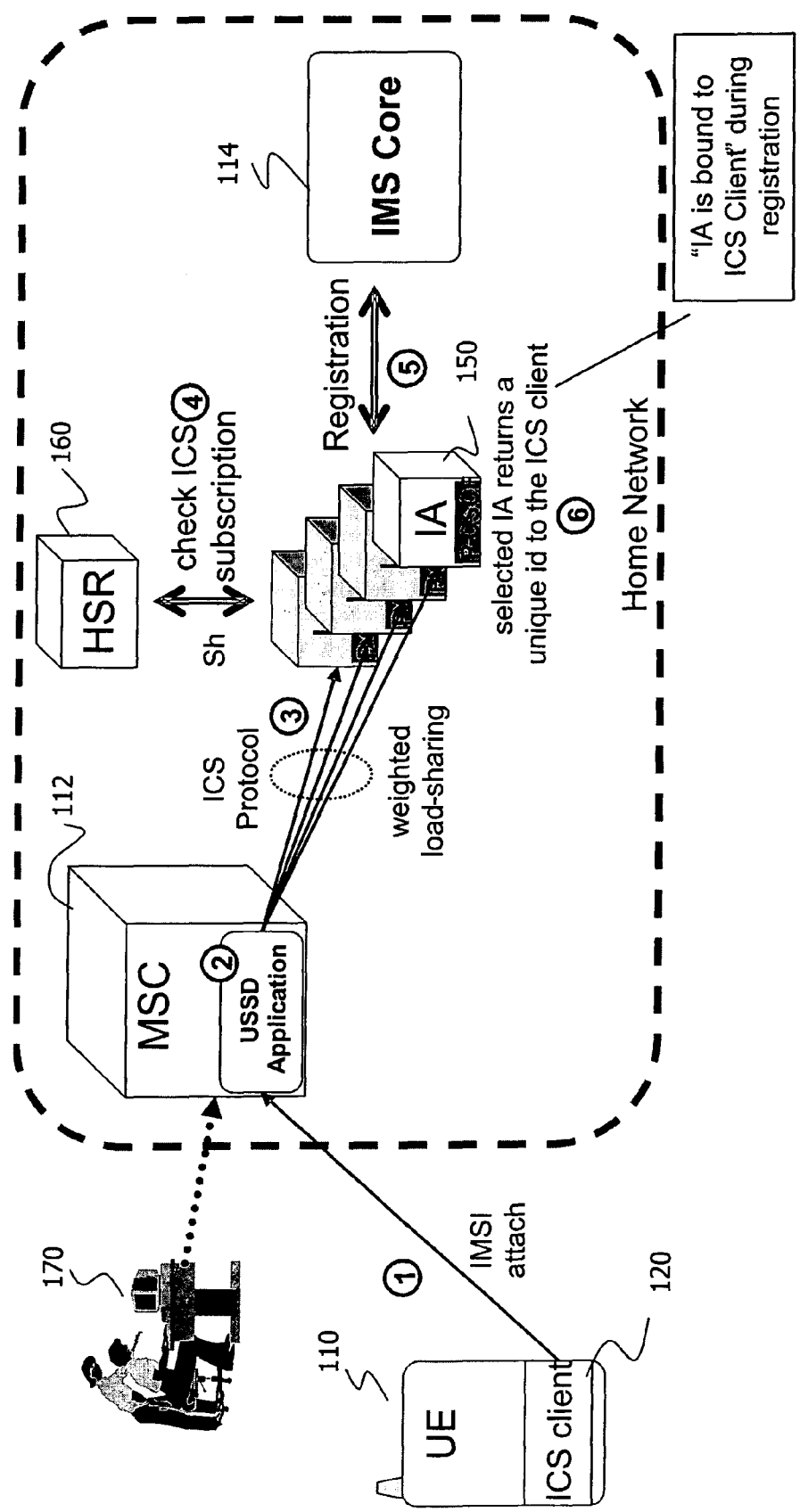
Figure 7:
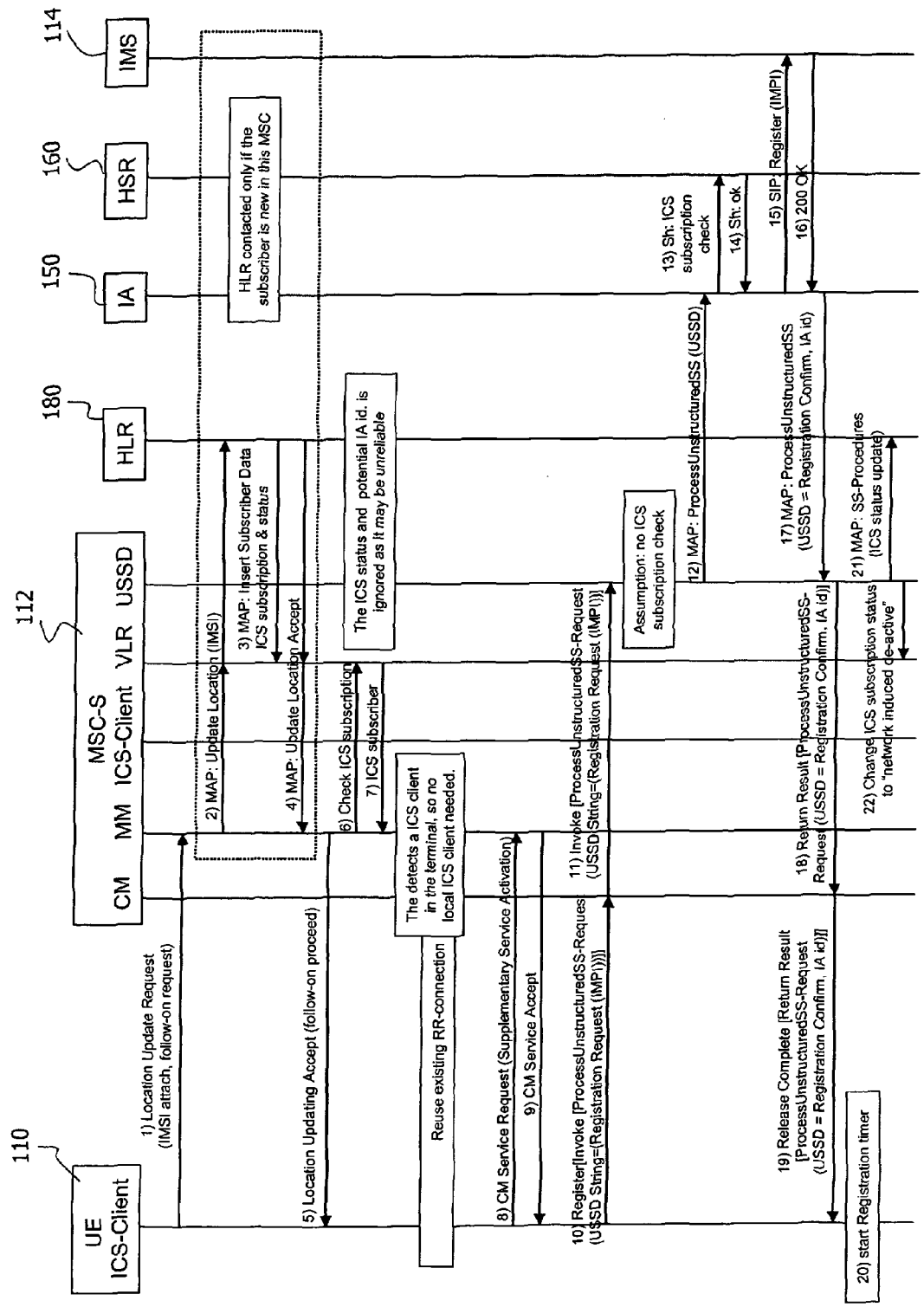

FIGS. 6 and 7 show an IMSI Attach procedure for a terminal 110 roaming in a home network with ICS support. The IMSI Attach procedure involves a terminal-based ICS client application 120.

When roaming in the home network (or in any other network with ICS support), the selection procedure as shown in FIG. 6 starts with an IMSI Attach message that is sent by the terminal to the MSC-S 112 (step 1). The MSC-S 112 then has to determine whether to apply a network-based ICS client application or whether to use any terminal-based ICS client application 120 (step 2). This decision in the MSC-S 112 can be based on the various pieces of information as specified by, for example, a network operator 170. The MSC-S 112 can detect the existence of the ICS client application 120 in the terminal 110 based on the following criteria:
The subscriber data in the VLR (not shown) contain a subscription to ICS
and a request for follow-on is received at IMSI Attach, wherein this follow-on is an IMS Registration via USSD on a Call Independent transaction (so an USSD application in the MSC-S 112 checks the USSD strings received from the terminal 110 to determine whether an IMS Registration is initiated by the terminal 110),
or
the subscriber data in the VLR contain a subscription to ICS
and a newly defined ICS indication Information Element (IE) is detected in the 24.008 IMSI Attach message,
or
the subscriber data in the VLR contains a subscription to ICS
and a newly defined 24.008 Classmark IE indicator is added by the terminal 110 to indicate ICS support in the terminal 110.

The MSC-S 112 then performs IA selection (step 3) based on load sharing consideration. In next step, an ICS subscription check is done by the selected IA 150 towards a Home Subscriber Register (HSR) 160 (step 4). If an ICS subscription exists, the terminal 120 is registered in the IMS 114 (step 5). Additionally, the selected IA 150 returns its unique identifier to the MSC-S 112 as well as to the ICS client application 120 residing on the terminal 110 (step 6) for future use.

The signalling flow in the case that a terminal-based ICS client application 120 is detected by the MSC-S 112 is sketched in FIG. 7 and will be briefly explained below:

Steps 1)-5): Location Update type IMSI Attach, update towards HLR 180 (not shown in FIG. 6) and insertion of subscriber data into VLR (not shown in FIG. 6). The subscriber data contain an indication of the ICS subscription.

Steps 6)-7): The Mobility Management layer in the MSC-S 112 checks the ICS subscription in the VLR. In this sequence it is assumed that the ICS client application 120 in the terminal 110 is detected by the follow-on request at IMSI attach.

Steps 8)-9): The terminal 110 opens a Call Independent transaction.

Steps 10)-12). The terminal-based ICS client application 120 uses the established Call Independent transaction to send a USSD string to the IA 150.

Steps 13)-16): The IA 150 authorizes the ICS service in the HSR 160 and performs IMS Registration.

Steps 17)-20): The IA 150 returns a USSD string to the ICS client application 120 in the terminal 110 to indicate the IMS Registration success. The ICS client application 120 will start a Registration supervision timer.

Steps 21)-22): The USSD application in the MSC-S 112 will update the ICS service status in the VLR and the HLR 180, indicating that the network-based ICS client application is de-activated. The selection procedure is then completed.

Figure 8:
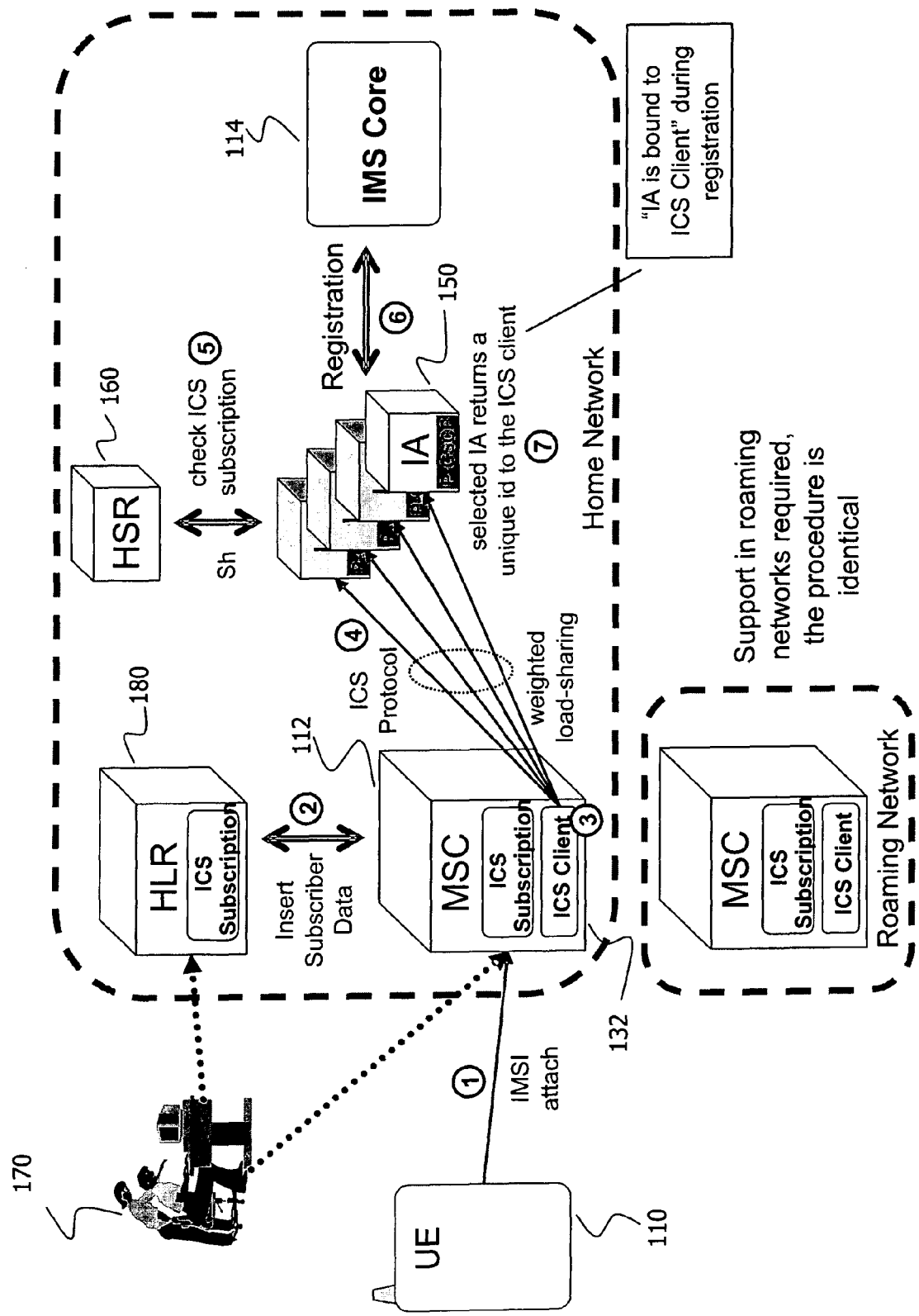
Figure 9:
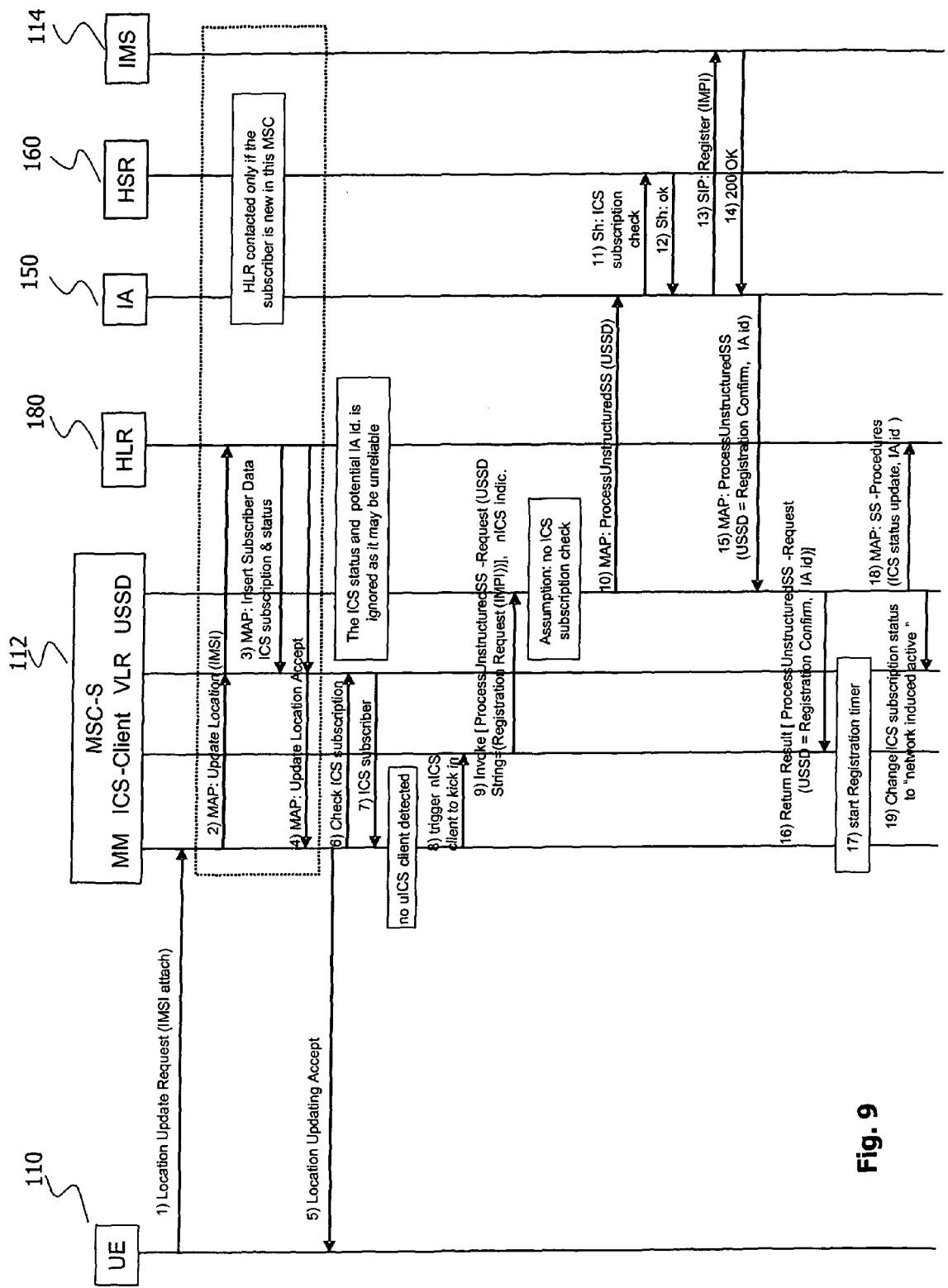

In case the MSC-S 112 cannot detect any terminal-based ICS support, network-centric ICS support is activated. In this regard, FIGS. 8 and 9 show an IMSI Attach procedure for a terminal 110 roaming in the home network. The IMSI Attach procedure involves a network-based ICS client application 132 and proceeds as schematically illustrated by steps 1 to 7 in FIG. 8. A more detailed depiction of the related signalling flow is shown in FIG. 9:

Steps 1)-5): Location Update type IMSI Attach, update towards HLR 180 and insertion of subscriber data into VLR. The subscriber data contain the ICS subscription.

Steps 6)-7): The Mobility Management layer in the MSC-S 112 checks the ICS subscription in the VLR. In this sequence it is assumed that no KS client application in the terminal 110 can be detected.

Step 8): The Mobility Management layer in the MSC-S 112 activates a network-based ICS support for the subscriber.

Steps 9)-10): The network-based ICS client application uses the established Call Independent transaction to send a USSD string to the IA 150.

Steps 11)-14): The IA 150 authorizes the ICS service in the HSR 160 and performs IMS Registration.

Steps 15)-17): The IA 150 returns a USSD string to the network-based ICS client application to indicate the IMS Registration success. The ICS client application will start a Registration supervision timer.

Steps 21)-22): The USSD application in the MSC-S 112 will update the ICS service status in the VLR and the HLR 180, indicating that the network-based ICS client application is activated, and also the IA identifier which has been received in the reply. The selection procedure is then completed.

Figure 10:
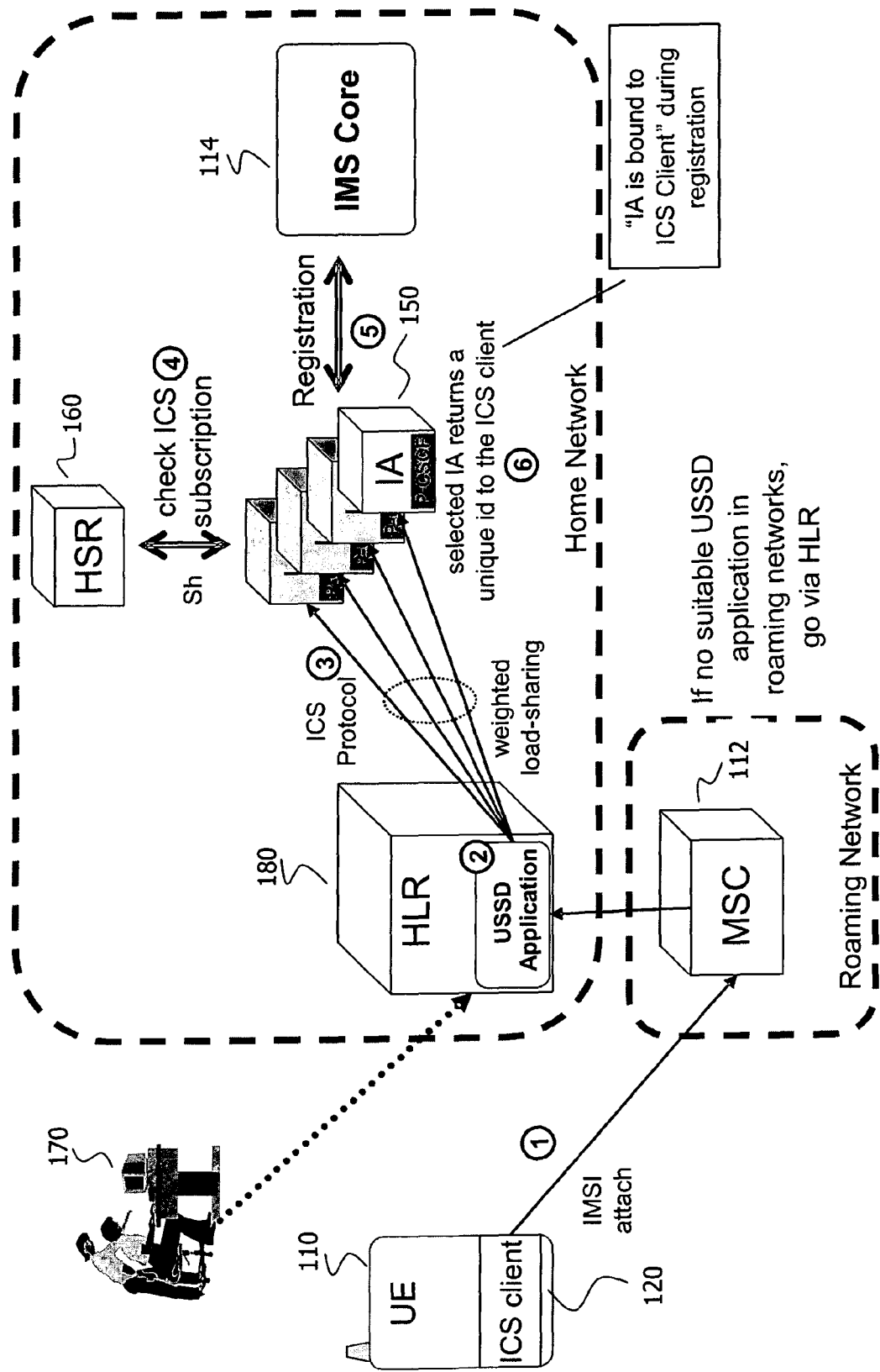

FIG. 10 show an IMSI Attach procedure for a terminal 110 roaming in a visited network without network-based ICS support. In this case the terminal-based ICS client application 120 has to be used, or the subscriber will not be able to use IMS centralized services at all.

As illustrated in FIG. 10, the signalling starts with an IMSI Attach message that is sent form the terminal 110 to the MSC-S 112 in the visited network (step 1). The MSC-S 112 in the visited network does not provide any ICS support and will thus forward any USSD operations transparently to an USSD application residing on the HLR 180 in the home network (step 2). The HLR 180 performs IA selection (step 3) based on load sharing consideration. Then, an ICS subscription check is done by the selected IA 150 towards the HSR 160 (step 4). If an ICS subscription exists, the terminal 120 is registered in the IMS 114 (step 5). Moreover, the selected IA 150 returns its unique identifier to the HLR 180 as well as to the ICS client application 120 residing on the terminal 110 (step 6) for future use.

In the scenarios shown in FIGS. 6 to 10, the MSC-S 112 can also implement additional mechanisms to give the operator 170 or a subscriber control over the decision whether to use a network-based ICS client application or whether to allow a terminal-based ICS client application. The additional functionality in the MSC-S 112 could activate network-based ICS support although a terminal-based ICS client application is available and has been detected by the MSC-S 112. This overriding can be based on operator preferences, e.g. expressed by a barring indicator for terminal-based ICS support in the subscriber data, or by setting such a barring for all roaming subscribers from a specific network. The overriding can be implemented in the USSD application of the MSC-S 112 (for example by rejecting any IMS Registration USSD strings in the MSC-S 112).

Roaming Scenarios in the CS Network

Figure 11:
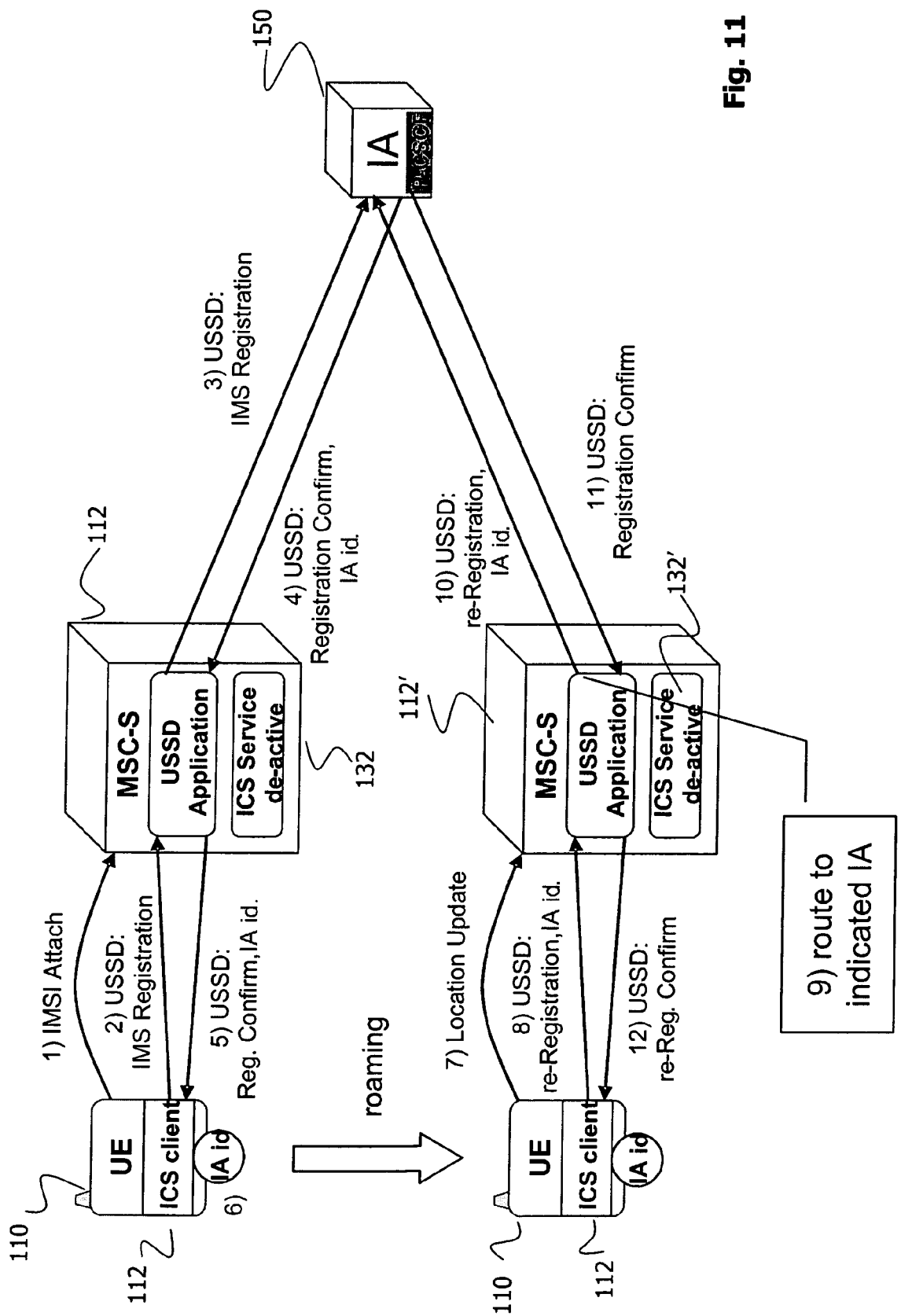
Figure 12:
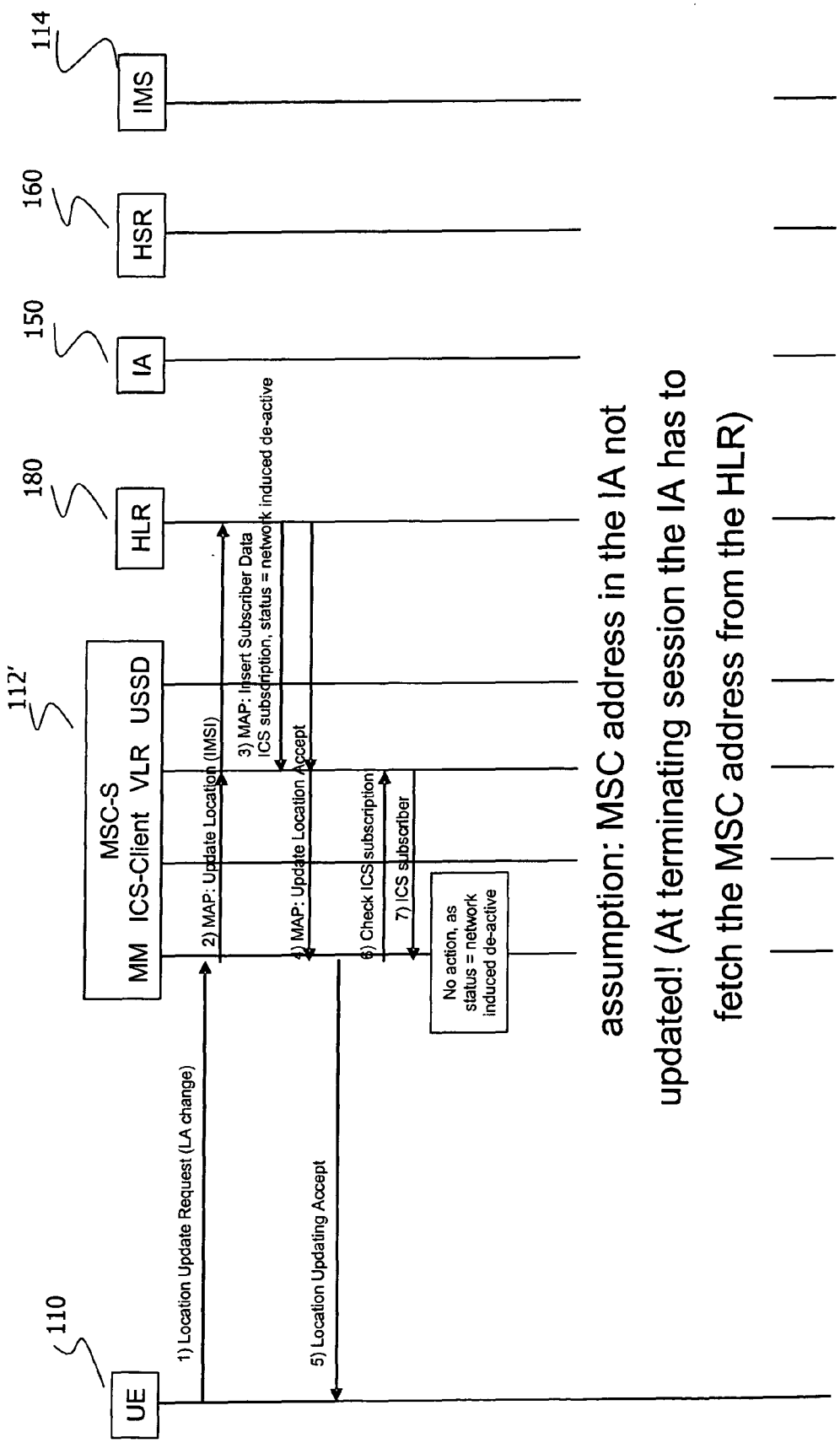

FIGS. 11 and 12 illustrate the activities in relation to an activated terminal-based ISC client application as performed for a roaming terminal 110. When roaming in the service area of the same MSC-S 112 that has performed the original ISC client selection procedure shown in FIGS. 6 and 7, no new actions are performed as illustrated by steps 1 to 6 in FIG. 11. When leaving the service area of the old MSC-S 112 and entering the service area of a new MSC-S 112', the IA identifier and the status of the ICS service are downloaded from the HLR 180, so if a terminal-based ICS client application has been used before, this state will be continued and the same IA 150 will be used further on (steps 7 to 12 in FIG. 11).

A more detailed depiction of the related signalling flow is shown in FIG. 12:

Steps 1)-5): Location Update type LA Change, update towards HLR 180 and insertion of subscriber data into VLR. The subscriber data contain the ICS subscription. The state indicates that the network-based ICS support (i.e., the network-based ICS client application) is de-activated.

Steps 6)-7): The Mobility Management layer in the MSC-S 112 checks the ICS subscription in the VLR. Since the state indicates that the network-based ICS support is de-activated, no further action is done in the MSC-S 112.

Figure 13:
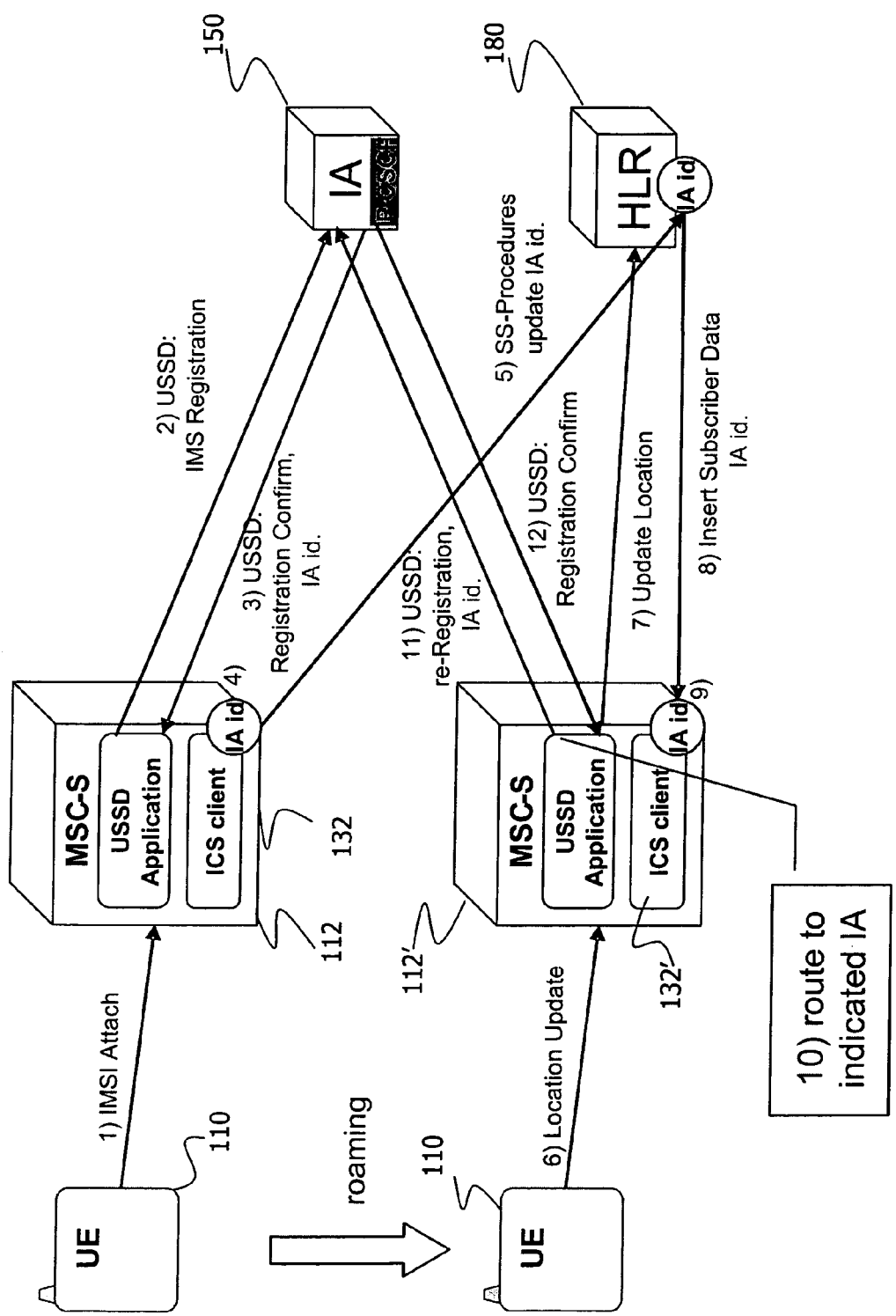
Figure 14:
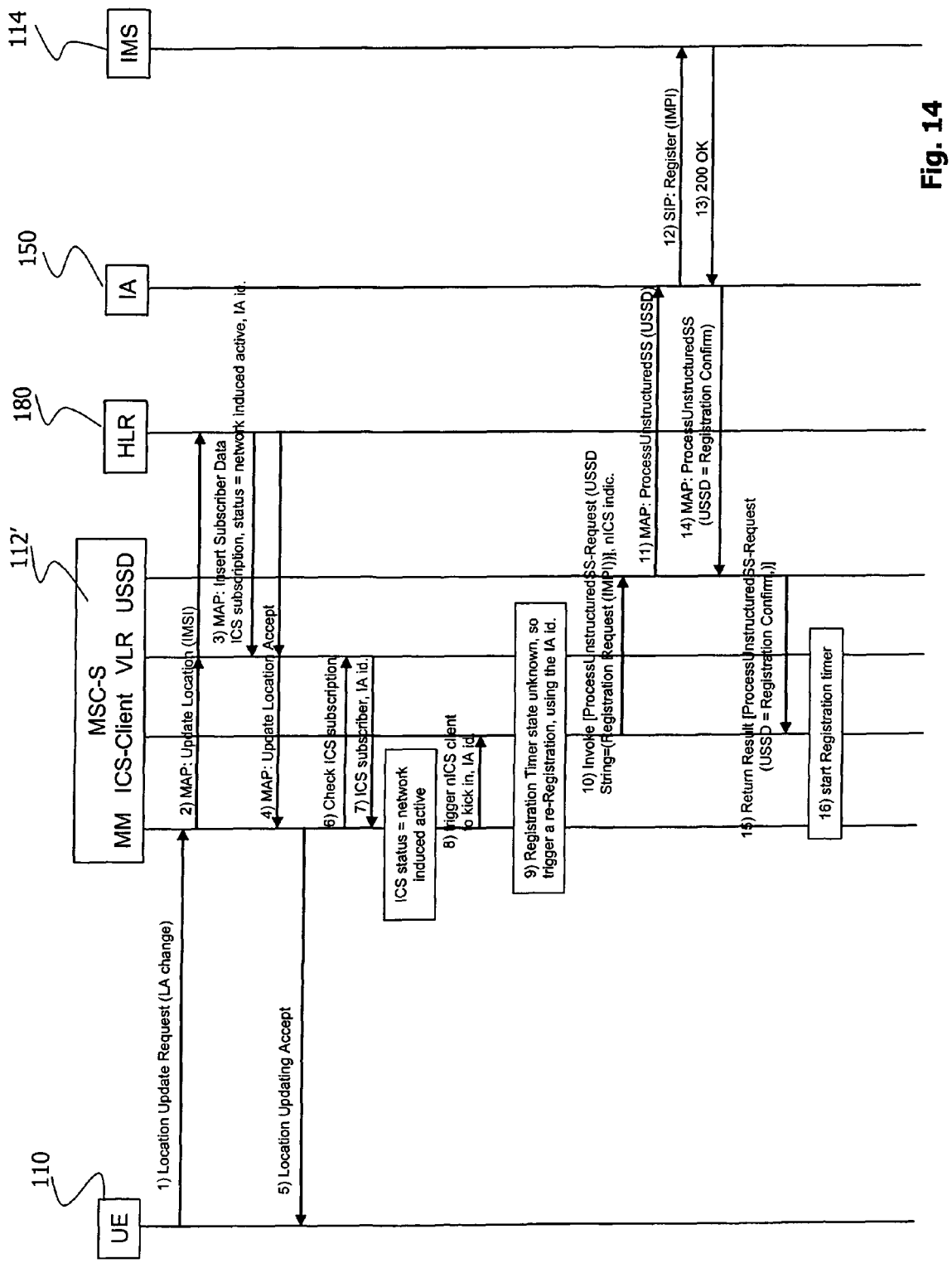
Figure 15:
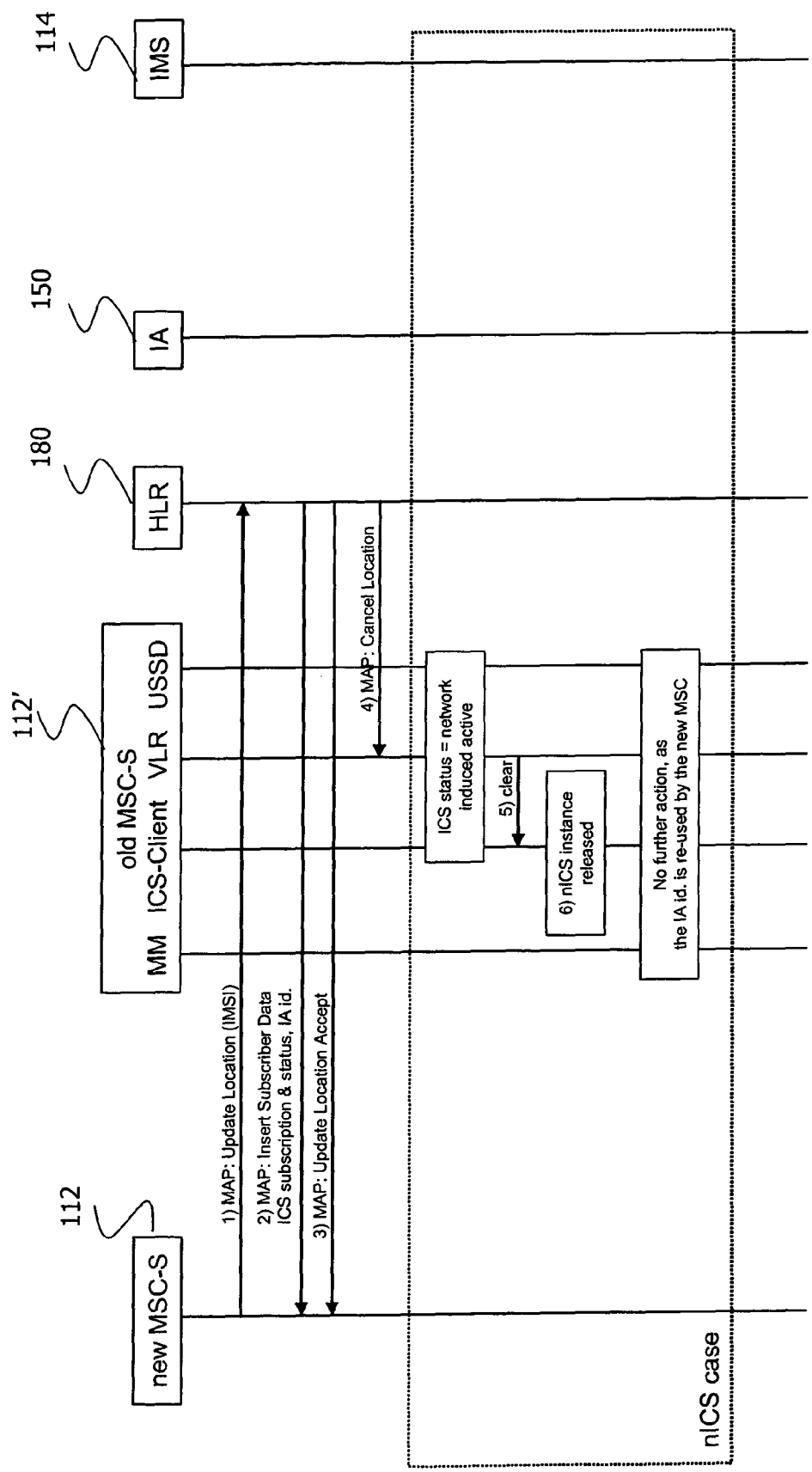

FIGS. 13 and 14 illustrate the activities in relation to an activated network-based ISC client application as performed for a roaming terminal 110. When roaming in the service area of the same MSC-S 112 that has performed the original ISC client selection procedure as illustrated in FIGS. 8 and 9, no new actions are performed as illustrated by steps 1 to 5 in FIG. 13. When leaving the service area of the old MSC-S 112 and entering the service area of a new MSC-S 112', the IA identifier and the status of the ICS service are downloaded from the HLR 180, so if a network-based ICS client application has been used before, this state is continued and the same IA 150 is used further on (steps 6 to 12 in FIG. 13).

A more detailed depiction of the related signalling flow is shown in FIG. 14:

Steps 1)-5): Location Update type LA Change, update towards HLR 180 and insertion of subscriber data into VLR. The subscriber data again contain the ICS subscription. The state indicates that the network-based ICS support is activated, plus the allocated IA identifier.

Steps 6)-7): The Mobility Management layer in the MSC-S 112' checks the ICS subscription in the VLR. Since the state indicates that the network-based ICS support is activated, a new local network-based ICS client application has to be seized by the MSC-S 112'.

Steps 8)-9): The new ICS client application is seized. Since the new ICS client application does not have any data of the active IMS Registration and timer status, a IMS re-Registration has to be triggered.

Steps 10)-16): IMS re-Registration is done via the same IA 150 as before. No HSR subscription check needed.

Cancel Location Procedures involving the HLR

When the terminal 110 enters the service area of a new MSC-S 112', the old MSC-S 112 is cancelled from the HLR 180. In case of an activated terminal-based ICS client application, no further actions are needed. This case is identified by the new MSC-S 112' by checking the ICS subscription status in the VLR. If network-centric ICS support was used, the ICS client application in the old MSC-S 112 has to be released as shown in the signalling flow of FIG. 15. Since the IA 150 is reused by the new MSC-S 112', no further actions are needed towards the IA 150 or IMS 114.

CS Detach Handling

Figure 16:
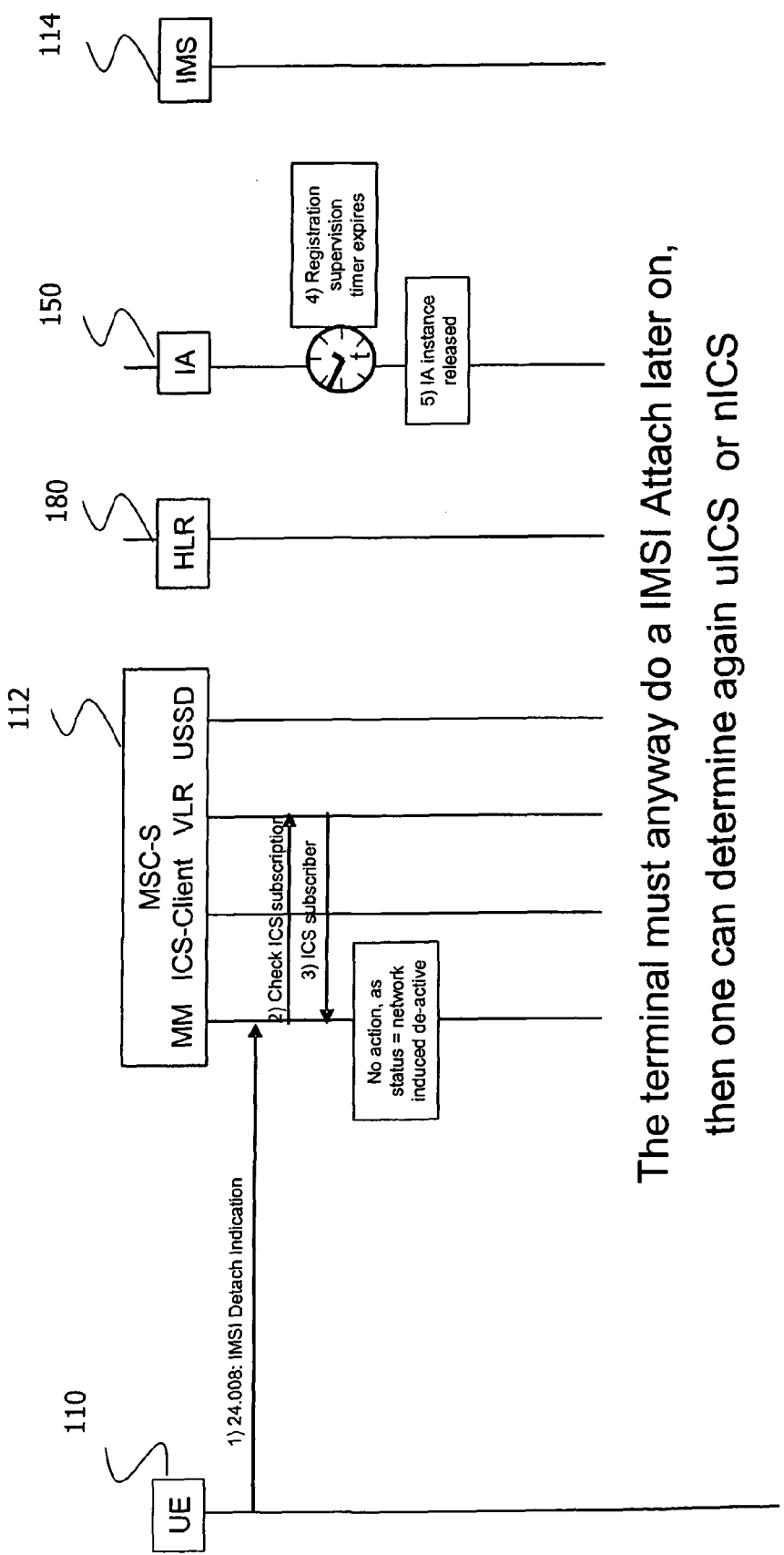
Figure 17:
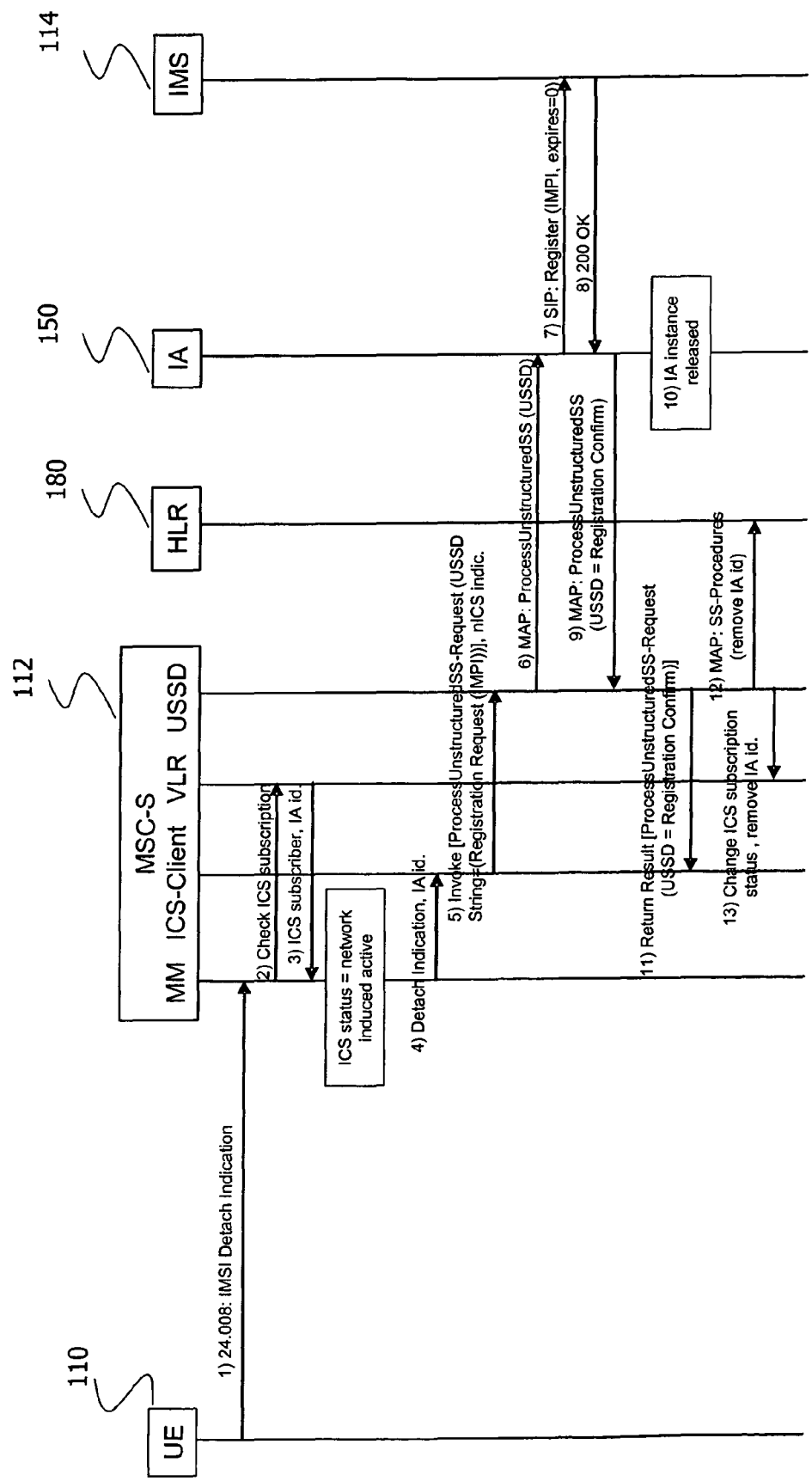

When the terminal 110 powers-off, a Detach indication is received in the MSC-S 112 as schematically shown in the signalling flows of FIGS. 16 and 17.

In the case of a terminal-based ICS client application (FIG. 16), no further action can be performed as the terminal 110 cannot send any USSD string.

Step 1): Detach indication from the terminal 110 is received by the MSC-S 112.

Steps 2)-3): The Mobility Management layer in the MSC-S 112 checks the ICS subscription. Since network-based ICS support is deactivated, no further actions are done.

Steps 4)-5): The Registration supervision timer in the IA 150 expires and the IA 150 releases itself. The IMS Registration expires and is removed automatically by the IMS 114.

It should be noted that in the scenario illustrated in FIG. 16, the MSC-S 112 cannot contact the IA 150 because it has not been informed about the IA identifier (terminal-based ICS support).

In the case of a network-based ICS client support, the network-based ICS client application can still take down the IMS Registration as sketched in FIG. 17:

Step 1): Detach indication from the terminal 110 received by MSC-S 112.

Steps 2)-3): The Mobility Management layer in the MSC-S 112 checks the ICS subscription, this check indicates that the network-based ICS client application is in an activated state.

Step 4): The Mobility Management layer informs the ICS client application in the network about the detach.

Steps 5)-11): IMS de-registration via the IA 150 is performed, and the IA instance is released.

Steps 12)-13) The USSD application in the MSC-S 112 updates the HLR 180 and VLR and removes the IA identifier.

Re-Registration Procedure

The ICS client application has to time supervise the IMS Registration, i.e. shortly before the IMS Registration would expire, the ICS client application will have to reregister the subscriber and thus the terminal 110.

Figure 18:
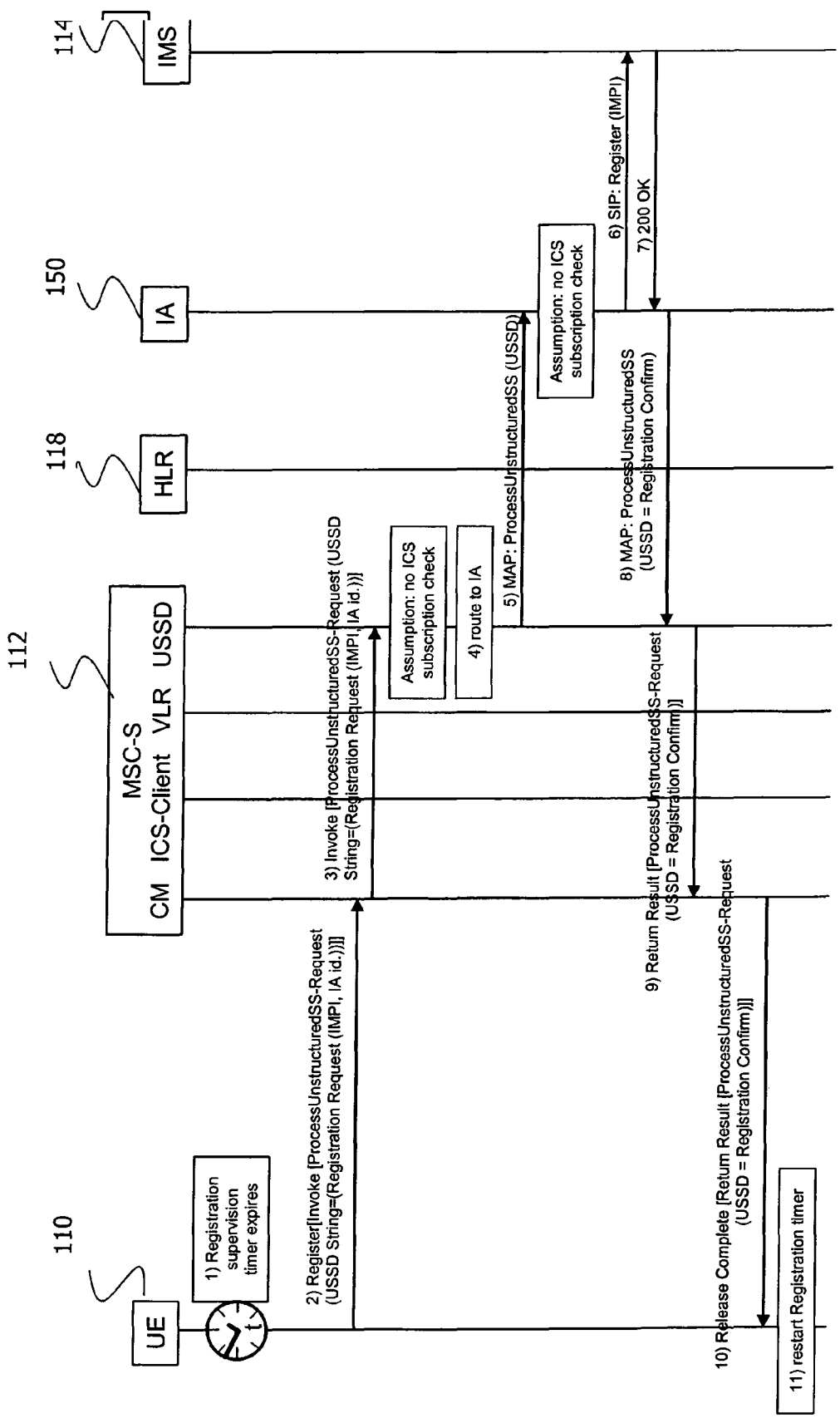

In the case of a terminal-based ICS client application, this is done within the terminal 110 as shown in the signalling flow of FIG. 18 in more detail. When the timer expires, a Call Independent transaction is established, and via USSD a re-registration is initiated.

Figure 19:
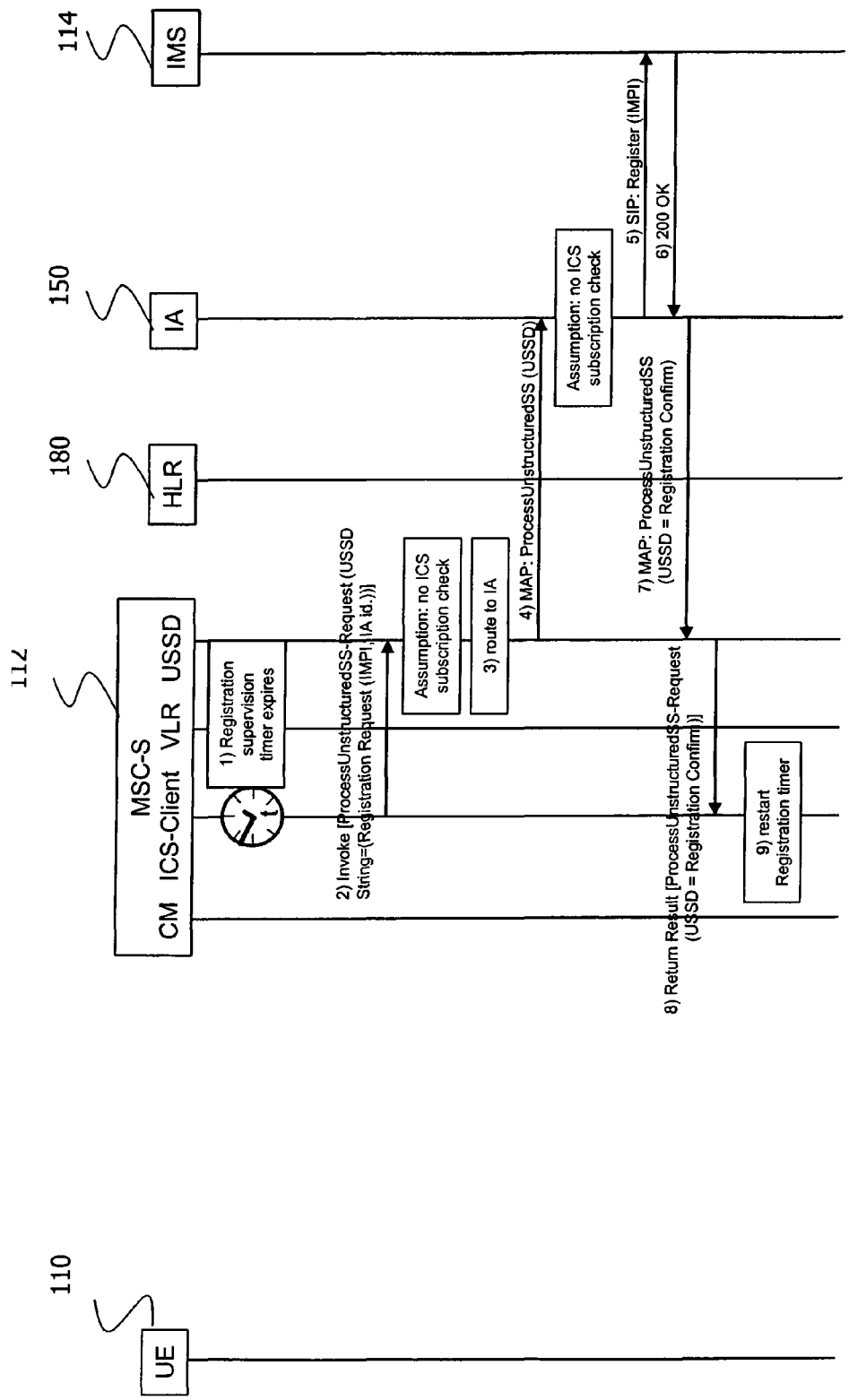

In the case of a network-based ICS client application, the timer runs in the MSC-S 112 as illustrated in the signalling flow of FIG. 19. When the timer at the timer expires, the network-based ICS client application contacts the IA 150 for re-registration.

Self-Administration

The network based ICS support and its status management can be provisioned by the operator in the HLR 180. The status can be changed by the subscriber by using:

the existing Supplementary Service (SS) procedures, extended with the nICS service, or Ut procedures, or a web portal and PS access towards this web portal.

As has become apparent from the embodiments, the advantages of terminal-centric ICS (uICS) and network-centric ICS (nICS) can be combined into one dynamic solution where terminal-based and network-based client applications co-exist in one network for one subscriber (or one terminal). If the subscriber uses an advanced terminal that includes an ICS client application, the subscriber can use the terminal-based approach and experience the full IMS feature scope. If the subscriber uses a legacy terminal without ICS client application, the network assistance can be obtained to benefit from one, more or all of the IMS features.

In the embodiments, the network side dynamically adapts to the capabilities of the terminal side and either provides a network-centric ICS client application, or the network-centric ICS client application is deactivated if the network detects an ICS client application in the terminal, or the network explicitly instructs the terminal to activate the ICS client application installed on the terminal. Furthermore the embodiments illustrate how ICS client support, once provided, is maintained while roaming in the CS network between MSC-S nodes.

Although embodiments of the present invention have been illustrated in the accompanying drawings and described in the description, it will be understood that the invention is not limited to the embodiments disclosed herein. In particular, the invention is capable of numerous rearrangements, modifications and substitutions without departing from the spirit of the invention as set forth and defined by the following claims.

The invention claimed is:

1. In a mobile communication network, a method of controlling an activation state of one or more IMS Centralized Services (ICS) client applications supporting ICS routing of a call from a circuit-switched access domain to an Internet Protocol Multimedia Subsystem (IMS) unified service domain, the method implemented by a network node comprising the steps of:

receiving, at the network node, a message from a terminal, where a first ICS client application is provided on the network node;

in response to the message, detecting, at the network node, that a second ICS client application is provided on the terminal to support ICS routing functionalities;

controlling, at the network node, an activation state of the first ICS client application dependent on a result of the detection, wherein the controlling includes deactivating the first ICS client application.

2. The method of claim 1, further comprising controlling an activation state of the second ICS application.

3. In a mobile communication network, a method of controlling an activation state of one or more IMS Centralized Services (ICS) client applications supporting ICS routing of a call from a circuit-switched access domain to an Internet Protocol Multimedia Subsystem (IMS) unified service domain, the method implemented by a network node comprising the steps of:
receiving, at the network node, a message from a terminal, where a first client application is provided on the network node;
in response to the message, detecting, at the network node, that no second ICS client application is provided on the terminal to support ICS routing functionalities; and
controlling, at the network node, an activation state of the first ICS client application dependent on a result of the detection, wherein the controlling includes activating or maintaining the activated state of the first ICS client application.

4. The method of claim 3, wherein the first ICS client application is controlled to be in an activated state if the second ICS client application cannot be detected.

5. The method of claim 3, wherein the first ICS client application is controlled to be in a deactivated state if the second ICS client application can be detected.

6. The method of claim 5, further comprising, in the deactivated state of the first ICS client application, the step of transparently forwarding control signaling from and to the second ICS client application.

7. The method of claim 3, wherein the message includes an indication of the ICS client application that is to support ICS call routing functionalities, wherein the activation state of the first ICS client application is controlled dependent on the indication in the message.

8. The method of claim 7, wherein the indication is a request for registration in the IMS unified service domain generated by the second ICS client application.

9. The method of claim 3, further comprising sending an instruction relating to an activation state of the second ICS client application to the terminal.

10. The method of claim 3, further comprising storing the current activation state of at least one of the first and second client ICS application in a location register database.

11. The method of claim 3, further comprising the steps of selecting an interface component towards the IMS unified service domain: and connecting an activated one of the first and second ICS client application to the selected interface component.

12. The method of claim 11, further comprising sending an identifier of the selected interface component to at least one of a location register database and the activated one of the first and second ICS client component.

13. The method of claim 12, further comprising, for the terminal roaming into a visited network, the steps of
receiving, by the visited network, the identifier of the selected interface component; and
performing, by the visited network, a renewal of a registration of the roaming terminal in the IMS unified service domain via the selected interface component.

14. The method of claim 13, further comprising, in the visited network, the steps of receiving and assessing the activation state of the first ICS client application in the previous network; and instantiating a new first ICS client application in the visited network if the first ICS client application in the previous network is in the activated state.

15. The method of claim 3, wherein the ICS routing functionalities are provided on a subscription basis, and further comprising at least one of requesting and receiving subscription information.

16. The method of claim further comprising the steps of
requesting authorization information regarding the ICS routing functionalities;
receiving the requested authorization information; and
registering the terminal in the IMS unified service domain dependent on the received authorization information.

17. In a mobile communication network, a method of controlling an activation state of one or more IMS Centralized Services (ICS) client applications supporting ICS routing of a call from a circuit-switched access domain to an Internet Protocol Multimedia Subsystem (IMS) unified service domain, the method implemented by a terminal comprising the steps of:
generating, at the terminal, an indication that a second ICS client application is provided on the terminal to provide the ICS call routing functionalities; and
transmitting, from the terminal, the indication to a network node at which there is provided a first ICS client application to effect a deactivation of the first ICS client application.

18. The method of claim 17, further comprising the step of providing the second ICS client application on the terminal; wherein the indication includes a reference to the availability of the second ICS client application.

19. The method of claim 17, further comprising activating the second ICS client application.

20. In a network, a network node for controlling an activation state of one or more IMS Centralized Services (ICS) client applications providing functionalities that support ICS routing of a call from a circuit-switched access domain to an Internet Protocol Multimedia Subsystem (IMS) unified service domain, the network node comprising:
a first ICS client application;
an interface adapted to receive a message from a terminal;
a detector for detecting, in response to the message, that a second ICS client application is provided on the terminal to provide the routing functionalities; and
a controller for controlling the activation state of the first ICS client application dependent on a result of the detection, wherein the controlling includes deactivating the first ICS client application.

21. In a network, a network node for controlling an activation state of one or more IMS Centralized Services (ICS) client applications supporting ICS routing of a call from a circuit-switched access domain to an Internet Protocol Multimedia Subsystem (IMS) unified service domain, the network node comprising:
a first ICS client application;
an interface for receiving a message from the terminal;
a detector for detecting, in response to the message, that no second ICS client application is on the terminal to provide the routing functionalities; and
a controller for controlling the activation state of the first ICS client application dependent on a result of the detection, wherein the controlling includes activating or maintaining the activated state of the first ICS client application.

22. In a network, a terminal for controlling an activation state of one or more IMS Centralized Services (ICS) client applications providing routing of a call from a circuit-switched access domain to an Internet Protocol Multimedia Subsystem (IMS) unified service domain, the terminal comprising:
- a processor for generating an indication that a second ICS client application is provided on the terminal to provide the call routing functionalities; and
- an interface for transmitting the Indication to a network node at which there is provided a first ICS client application to effect a deactivation of the first ICS client application.

23. The terminal of claim 22, further comprising the second client application.

24. In a mobile communication network, a method of controlling an activation state of one or more IMS Centralized Services (ICS) client applications supporting ICS routing of a call from a circuit-switched access domain to an Internet Protocol Multimedia Subsystem (IMS) unified service domain, the method implemented by a network node comprising the steps of:
- receiving, at the network node, a message from a terminal, where a first ICS client application is provided on the network node;
- in response to the message, detecting, at the network node, whether a second ICS client application is provided on the terminal to support the ICS routing functionalities;
- if yes, then deactivating, at the network node, the first ICS client application; and
- if no, then activating or maintaining, at the network node, the activated state of the first ICS client application.

25. In a network, a network node for controlling an activation state of one or more IMS Centralized Services (ICS) client applications providing functionalities that support ICS routing of a call from a circuit-switched access domain to an Internet. Protocol Multimedia Subsystem (IMS) unified service domain, the network node comprising:
- a first ICS client application;
- an interface adapted to receive a message from a terminal;
- a detector for detecting, in response to the message, whether a second ICS client application is provided on the terminal to provide the routing functionalities; and
- a controller for controlling the activation state of the first ICS client application dependent on a result of the detection, wherein the controlling includes deactivating the first ICS client application if the second ICS client application is provided on the terminal, and wherein the controlling includes activating or maintaining the activated state of the first ICS client application if the second ICS client application is not provided on the terminal.

* * * * *

UNITED STATES PATENT AND TRADEMARK OFFICE
CERTIFICATE OF CORRECTION

PATENT NO. : 8,441,949 B2  Page 1 of 1
APPLICATION NO. : 12/518633
DATED : May 14, 2013
INVENTOR(S) : Witzel et al.

It is certified that error appears in the above-identified patent and that said Letters Patent is hereby corrected as shown below:

In the Drawings

In Fig. 5, Sheet 5 of 19, delete " connecti handling " and insert -- connection handling --, therefor.

In Fig. 18, Sheet 18 of 19, delete " 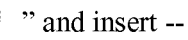 " and insert --  --, therefor.

In the Specification

In Column 9, Line 48, delete "INS 114." and insert -- IMS 114. --, therefor.

In the Claims

In Column 15, Line 9, in Claim 3, delete "client" and insert -- ICS client --, therefor.

In Column 15, Line 47, in Claim 11, delete "domain:" and insert -- domain; --, therefor.

In Column 15, Line 56, in Claim 13, delete "step of" and insert -- step of: --, therefor.

In Column 16, Line 5, in Claim 16, delete "claim further comprising the steps of" and insert -- claim 3, further comprising the steps of: --, therefor.

In Column 18, Line 7, in Claim 25, delete "Internet." and insert -- Internet --, therefor.

Signed and Sealed this
Eleventh Day of February, 2014

Michelle K. Lee
*Deputy Director of the United States Patent and Trademark Office*